US012710864B2

(12) United States Patent
Argekar et al.

(10) Patent No.: US 12,710,864 B2
(45) Date of Patent: Aug. 18, 2026

(54) METHOD AND DEVICE FOR RECOGNIZING PLURALITY OF GESTURES PROVIDED VIA A PLURALITY OF TOUCH INTERFACES

(71) Applicant: SAMSUNG ELECTRONICS CO., LTD., Suwon-si (KR)

(72) Inventors: Manjunath Vinay Argekar, Uttar Pradesh (IN); Genemala Haobijam, Uttar Pradesh (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/764,658

(22) Filed: Jul. 5, 2024

(65) Prior Publication Data

US 2024/0393939 A1 Nov. 28, 2024

Related U.S. Application Data

(63) Continuation of application No. PCT/KR2024/007914, filed on Jun. 10, 2024.

(30) Foreign Application Priority Data

Aug. 25, 2023 (IN) ............................. 202311057255

(51) Int. Cl.
*G06F 3/0488* (2022.01)
*G06F 3/041* (2006.01)

(52) U.S. Cl.
CPC .......... *G06F 3/0488* (2013.01); *G06F 3/0416* (2013.01); *G06F 2203/04104* (2013.01); *G06F 2203/04808* (2013.01)

(58) Field of Classification Search
CPC ................. G06F 3/0488; G06F 3/0416; G06F 2203/04104; G06F 2203/04808; G06F 3/04845; G06F 3/04847; G06F 3/04883
See application file for complete search history.

(56) References Cited

U.S. PATENT DOCUMENTS 7,519,223 B2 * 4/2009 Dehlin .................. G06V 40/28 345/173
8,698,764 B1 4/2014 Karakotsios et al.
(Continued)

FOREIGN PATENT DOCUMENTS

CN 103477304 A 12/2013
CN 112578981 A 3/2021
(Continued)

OTHER PUBLICATIONS

Jerryrigeverything, Nubia X-Dual Screen Smartphone?—Front AND Rear Displays Tested!, YouTube, Dec. 17, 2018, 2 pages, url: https://www.youtube.com/watch?app=desktop&v=IRwx4DMUx8s.
(Continued)

*Primary Examiner* — David D Davis
(74) *Attorney, Agent, or Firm* — Sughrue Mion, PLLC

(57) ABSTRACT

A method and user device are provided. The method includes: detecting a first finger touch on a primary touch interface of a user device; and detecting a second finger touch on a secondary touch interface of the user device. The method also includes identifying a first displacement of the first finger touch and a second displacement of the second finger touch within a timeframe window. The method further includes recognizing a multi-interface gesture based on the first displacement and the second displacement.

20 Claims, 17 Drawing Sheets

(56) References Cited

U.S. PATENT DOCUMENTS

| | | | | |
|---|---|---|---|---|
| 9,377,892 | B2 | 6/2016 | Kim et al. | |
| 9,671,828 | B2 | 6/2017 | Lee et al. | |
| 10,459,625 | B2 | 10/2019 | Seo et al. | |
| 11,016,660 | B2 | 5/2021 | Gao | |
| 11,934,651 | B2 | 3/2024 | Ahn et al. | |
| 2008/0309632 | A1 | 12/2008 | Westerman et al. | |
| 2012/0038561 | A1 | 2/2012 | Han | |
| 2013/0265284 | A1 | 10/2013 | Yun et al. | |
| 2017/0017388 | A1* | 1/2017 | Heo | G06F 3/0346 |
| 2017/0315635 | A1* | 11/2017 | Chase | G06F 3/03547 |
| 2018/0067638 | A1 | 3/2018 | Klein et al. | |

FOREIGN PATENT DOCUMENTS

| | | | | |
|---|---|---|---|---|
| EP | 3 053 015 | A1 | 8/2016 | |
| WO | 2010/093149 | A2 | 8/2010 | |
| WO | WO-2011026186 | A1 * | 3/2011 | G06F 3/0421 |

OTHER PUBLICATIONS

International Search Report dated Sep. 24, 2024, issued by the International Searching Authority in International Application No. PCT/KR2024/007914.

Written Opinion dated Sep. 24, 2024, issued by the International Searching Authority in International Application No. PCT/KR2024/007914.

Communication issued on Apr. 13, 2026 by Intellectual Property India in Indian Patent Application No. 202311057255.

* cited by examiner

Figure 1:
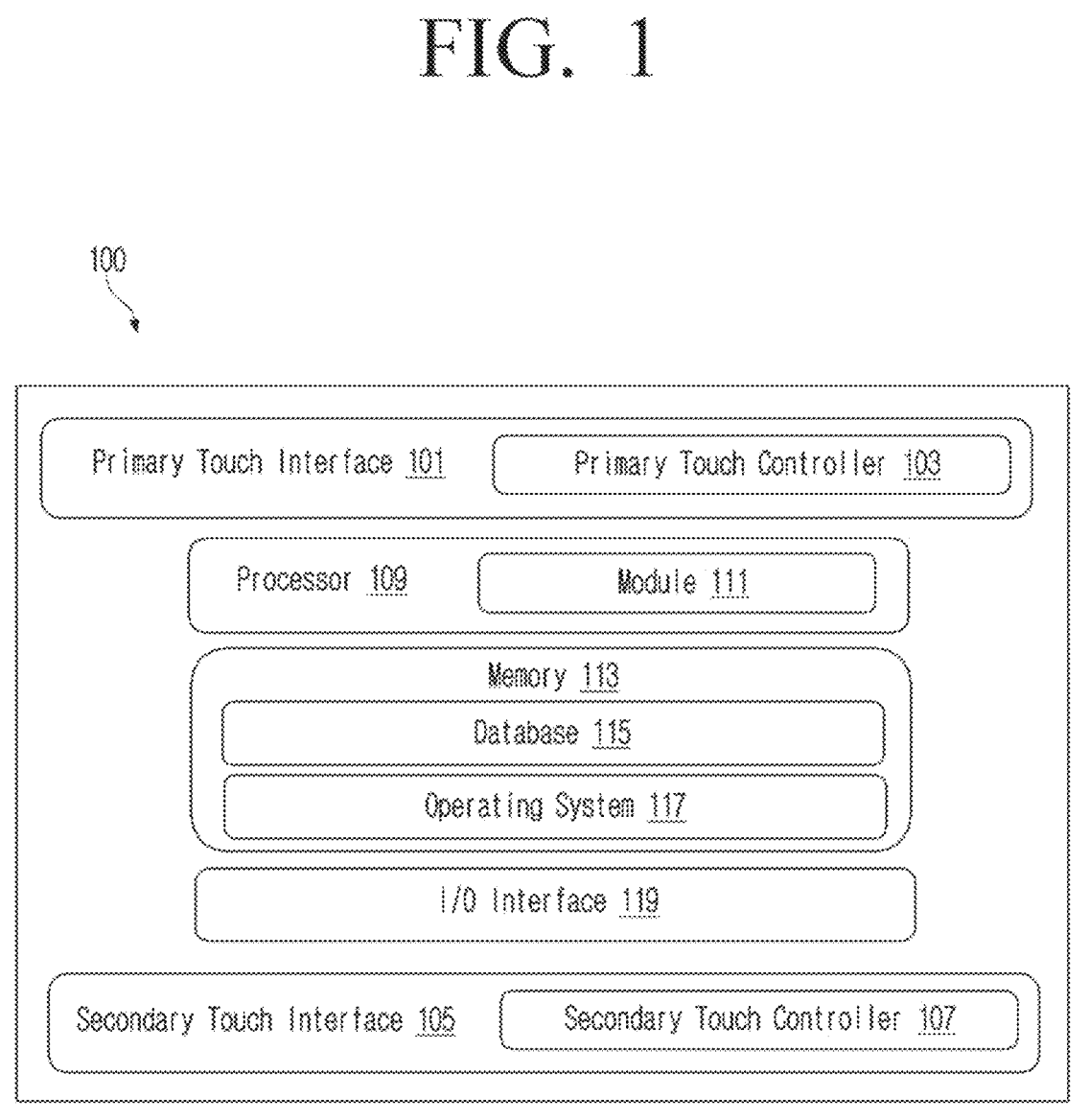

Primary Touch Interface 101

Primary Touch Controller 103

Processor 109

Module 111

Memory 113

Database 115

Operating System 117

I/O Interface 119

Secondary Touch Interface 105

Secondary Touch Controller 107

FIG. 3B

| | Tx00 | Tx01 | Tx02 | Tx03 | Tx04 | Tx05 | Tx06 | Tx07 | Tx08 | Tx09 | Tx10 | Tx11 | Tx12 | Tx13 |
|---|---|---|---|---|---|---|---|---|---|---|---|---|---|---|
| Rx00 | 0 | 0 | 0 | 0 | 0 | 0 | 0 | 0 | 0 | 0 | 0 | 0 | 0 | 0 |
| Rx01 | 0 | -7 | -20 | -17 | -9 | -19 | 5 | -30 | -32 | -11 | 0 | -7 | -15 | 35 |
| Rx02 | -9 | -3 | -9 | -19 | -28 | -22 | -35 | -2 | 0 | -26 | -3 | -15 | -20 | -9 |
| Rx03 | -5 | -7 | 7 | 9 | 2 | 2 | 18 | -2 | -1 | 11 | -1 | -9 | -1 | -23 |
| Rx04 | -10 | -4 | -3 | -5 | -1 | -7 | -30 | -18 | -19 | -8 | -18 | 15 | -10 | -15 |
| Rx05 | -9 | -9 | 5 | 1 | -4 | 3 | -1 | 10 | 13 | -9 | -2 | -4 | -8 | -6 |
| Rx06 | -8 | -2 | -9 | -15 | -10 | -20 | -12 | -8 | -3 | -4 | 4 | -16 | -13 | -3 |
| Rx07 | -7 | -10 | -1 | 0 | -9 | -4 | -12 | -12 | -22 | 2 | 13 | -4 | -6 | -20 |
| Rx08 | -11 | -13 | -7 | -12 | -4 | -10 | -8 | -11 | -5 | 8 | -4 | -10 | -6 | -10 |
| Rx09 | -5 | -13 | -4 | -9 | -12 | -12 | -3 | 1 | -18 | -1 | -9 | -8 | -8 | -7 |
| Rx10 | -10 | -9 | -1 | -5 | -4 | -8 | -9 | -16 | -11 | -22 | -1 | -13 | -9 | -25 |
| Rx11 | -11 | -9 | -3 | -2 | -7 | -6 | -12 | -11 | -13 | -11 | -3 | -1 | -9 | -7 |
| Rx12 | -11 | -8 | 1 | -10 | -15 | -12 | -8 | -6 | -9 | 3 | -21 | -5 | -5 | -4 |
| Rx13 | -7 | -10 | -8 | -6 | -12 | -10 | -8 | -7 | 1 | -1 | 5 | -10 | -11 | -6 |
| Rx14 | -10 | -16 | -3 | -6 | -1 | -18 | -10 | -15 | -10 | -7 | -9 | -6 | -13 | -11 |
| Rx15 | -6 | -10 | 0 | 1 | -7 | -4 | -11 | -7 | -8 | -4 | -14 | -4 | -5 | -6 |
| Rx16 | -8 | -11 | -8 | -14 | -18 | -5 | -7 | -12 | -1 | -6 | -1 | 0 | -16 | -11 |
| Rx17 | -6 | 0 | -6 | -7 | -5 | -16 | -10 | -15 | -8 | -17 | 2 | -5 | -6 | -3 |
| Rx18 | 25 | -13 | 4 | -2 | 21 | 31 | 1 | -8 | 18 | 12 | 41 | 36 | 7 | 22 |
| Rx19 | -17 | -15 | -12 | -9 | -20 | -16 | -18 | -7 | -8 | -2 | -11 | -19 | -19 | -25 |
| Rx20 | -10 | -7 | -3 | -6 | -10 | -14 | -18 | -19 | -16 | -13 | 13 | -9 | 4 | -6 |
| Rx21 | -7 | -7 | 0 | -11 | -10 | -8 | -9 | -11 | -4 | -11 | -6 | -7 | -13 | -13 |
| Rx22 | -10 | -6 | -8 | -2 | -9 | -9 | -6 | -1 | -13 | -11 | -13 | -3 | -14 | -2 |
| Rx23 | -6 | -10 | -7 | -2 | -6 | -13 | -8 | -6 | -12 | -11 | -6 | -5 | -8 | -5 |
| Rx24 | -7 | -5 | -6 | -4 | -6 | -7 | -4 | -17 | -11 | -8 | -15 | -22 | -12 | -15 |
| Rx25 | -3 | -5 | -4 | -1 | 0 | -9 | -1 | -3 | -1 | -4 | -11 | -10 | 2 | 0 |
| Rx26 | 2 | -5 | -1 | 4 | 3 | -2 | 1 | -7 | 7 | -8 | -10 | -3 | -5 | -7 |
| Rx27 | -8 | -5 | -5 | -12 | -11 | -17 | -11 | -1 | -12 | -10 | -4 | -15 | -7 | -6 |
| Rx28 | -7 | -9 | -8 | -13 | -22 | -22 | -19 | -21 | -21 | -11 | -12 | -9 | -11 | 3 |
| Rx29 | -5 | -3 | -3 | -3 | -7 | -12 | -10 | -9 | -6 | -9 | -9 | -6 | -8 | -10 |
| Rx30 | -9 | -6 | -9 | -7 | -6 | -9 | -10 | -13 | -3 | -16 | -13 | -17 | -9 | 1 |
| Rx31 | -2 | -2 | 0 | -8 | -10 | -9 | -6 | -3 | -10 | -12 | -16 | -12 | -6 | 2 |
| Rx32 | -5 | -3 | -3 | -9 | -11 | -19 | -6 | -7 | -4 | -4 | -13 | -7 | -9 | -1 |
| Rx33 | -5 | 2 | -4 | -8 | -7 | -3 | 6 | 10 | -1 | -5 | -10 | -9 | 8 | -13 |
| Rx34 | -1 | 10 | 9 | 5 | 13 | 22 | 12 | 17 | 22 | 15 | 17 | 22 | 20 | 4 |
| Rx35 | -8 | -7 | 5 | 3 | 3 | 8 | -14 | -18 | 3 | 7 | 19 | 13 | 0 | -11 |

No finger touch 321

FIG. 3C

| | Tx00 | Tx01 | Tx02 | Tx03 | Tx04 | Tx05 | Tx06 | Tx07 | Tx08 | Tx09 | Tx10 | Tx11 | Tx12 | Tx13 |
|---|---|---|---|---|---|---|---|---|---|---|---|---|---|---|
| Rx00 | 0 | 0 | 0 | 0 | 0 | 0 | 0 | 0 | 0 | 0 | 0 | 0 | 0 | 0 |
| Rx01 | 0 | -13 | -24 | -17 | -10 | -12 | 15 | -27 | -31 | -14 | 2 | -12 | -15 | 38 |
| Rx02 | -7 | -7 | -13 | -12 | -24 | -19 | -42 | 4 | 2 | -26 | -4 | -14 | -26 | -5 |
| Rx03 | -6 | -9 | 8 | 19 | 5 | 0 | 20 | 0 | 1 | 10 | -1 | -14 | 2 | -19 |
| Rx04 | -1 | -7 | -7 | -3 | -2 | -6 | -23 | -17 | -10 | -11 | -24 | 12 | -6 | -11 |
| Rx05 | -4 | -6 | 0 | 6 | 1 | -7 | 3 | 11 | 18 | -4 | -3 | 1 | -8 | 6 |
| Rx06 | -10 | -8 | -12 | -10 | -7 | -15 | -5 | -5 | 3 | -9 | 1 | -15 | -8 | 4 |
| Rx07 | -7 | -13 | 1 | 3 | -6 | 2 | -7 | -12 | -15 | -4 | 5 | -1 | -2 | -16 |
| Rx08 | -6 | -11 | -5 | -13 | 1 | -2 | 1 | 3 | 2 | 5 | -7 | -9 | -6 | -6 |
| Rx09 | -8 | -12 | -4 | -3 | -9 | -3 | 8 | 6 | -20 | -1 | -13 | -10 | -10 | -3 |
| Rx10 | -6 | -5 | -6 | 2 | 1 | 11 | 17 | 6 | -3 | -22 | -6 | -14 | -15 | -28 |
| Rx11 | -6 | -8 | -8 | 3 | 6 | 79 | 152 | 43 | 5 | -7 | -1 | -5 | -9 | -8 |
| Rx12 | 3 | 1 | 0 | -10 | 12 | -624 | -1031 | -407 | 21 | 7 | -12 | 0 | 2 | 9 |
| Rx13 | -10 | -10 | -5 | -4 | -15 | -73 | -174 | -516 | 19 | -2 | 2 | -8 | -11 | -4 |
| Rx14 | -14 | -20 | -14 | -11 | -35 | -706 | -850 | -701 | -57 | -31 | -24 | -22 | -17 | -21 |
| Rx15 | -14 | -13 | -7 | -7 | -25 | -122 | -536 | -297 | -38 | -17 | -21 | -10 | -10 | -6 |
| Rx16 | -9 | -12 | -16 | -14 | -24 | -16 | -29 | -21 | -12 | -8 | -7 | 1 | -15 | -15 |
| Rx17 | -2 | 0 | -7 | -10 | -5 | -22 | -9 | -11 | -13 | -21 | 0 | -4 | -7 | -5 |
| Rx18 | 11 | 0 | 11 | -2 | 9 | -8 | 18 | -2 | 48 | 14 | 1 | 22 | -13 | -2 |
| Rx19 | -8 | -22 | -11 | -7 | -17 | -16 | -19 | -13 | -9 | -8 | -16 | -17 | -18 | -9 |
| Rx20 | -6 | -16 | -7 | -7 | -11 | -14 | -14 | -10 | -15 | -11 | 10 | -17 | 4 | -7 |
| Rx21 | -6 | -6 | -9 | -8 | -8 | -7 | -8 | -14 | -6 | -13 | -5 | -8 | -15 | -10 |
| Rx22 | -3 | -11 | -14 | -5 | -11 | -7 | -9 | 6 | -9 | -9 | -14 | -6 | -12 | -4 |
| Rx23 | -7 | -6 | -9 | -9 | -2 | -13 | -7 | 1 | -14 | -10 | -2 | 0 | -2 | -2 |
| Rx24 | -5 | -7 | -9 | -1 | -3 | -6 | -2 | -17 | -17 | -10 | -15 | -19 | -12 | -10 |
| Rx25 | -3 | -7 | -8 | 0 | -2 | -1 | 1 | -3 | 2 | -5 | -9 | -12 | 0 | -4 |
| Rx26 | -3 | -5 | -5 | -1 | 4 | 3 | 5 | -7 | 2 | -7 | -6 | 1 | -7 | -4 |
| Rx27 | -3 | -2 | -4 | -13 | -14 | -6 | -7 | -3 | -12 | -10 | -1 | -11 | -6 | -11 |
| Rx28 | -4 | -5 | -8 | -14 | -20 | -17 | -21 | -20 | -24 | -18 | -5 | -6 | -5 | -1 |
| Rx29 | -5 | -5 | -5 | -2 | -3 | -2 | -12 | -9 | -13 | -13 | -7 | -5 | -5 | -14 |
| Rx30 | -2 | -5 | -10 | -7 | -8 | -1 | -9 | -11 | -13 | -14 | -12 | -12 | -6 | -3 |
| Rx31 | 1 | 3 | -4 | -8 | -9 | 0 | -6 | -3 | -16 | -6 | -16 | -6 | -7 | -5 |
| Rx32 | -2 | -4 | -1 | -8 | -6 | -8 | -12 | -7 | -17 | -7 | -4 | -3 | -2 | 3 |
| Rx33 | -3 | 4 | -12 | -8 | 1 | 3 | -3 | 3 | -14 | -5 | 1 | -10 | 3 | -9 |
| Rx34 | 2 | 12 | 12 | 11 | 16 | 16 | 11 | 11 | 18 | 15 | 18 | 15 | 13 | 1 |
| Rx35 | -13 | -6 | 4 | 2 | -4 | -11 | -12 | -14 | 16 | 6 | 0 | 8 | -3 | -14 |

Portion A

Finger touched 323

METHOD AND DEVICE FOR RECOGNIZING PLURALITY OF GESTURES PROVIDED VIA A PLURALITY OF TOUCH INTERFACES

CROSS-REFERENCE TO RELATED APPLICATION(S)

This application is a bypass continuation application of International Application No. PCT/KR2024/007914, filed on, Jun. 10, 2024, which is based on and claims priority to Indian patent application No. 202311057255, filed on Aug. 25, 2023, the disclosures of which are incorporated herein by reference in their entireties.

BACKGROUND

1. Field

The present disclosure generally relates to the field of gesture recognition, and more particularly to a method and device for gesture recognition in a user device with multiple touch interfaces.

2. Description of the Related Art

A gesture on a touch interface or a touch screen refers to a movement or action made by a user on a touch interface to interact with one or more corresponding devices for performing certain operations. For example a gesture may be made by one or more fingers of the user on the touch interface. Each gesture in the touch interface is recognized by the user device and may be used to trigger specific actions, such as selecting and moving an object, scrolling through a list, zooming in and out of an object, dragging and dropping an object, pinching, swiping, etc.

Further, to enhance user experience and cater to users' requirements on various applications, user devices may be equipped with multiple screens or touch interfaces. For example, a user device may include multiple touch screens, such as a multi-fold user device with separate screens mounted on opposite sides, or a wrap-around flexible touch screen. Generally, the multiple touch screens include a front side touch screen and a back side touch screen. However, while performing any intensive activities on the user device, such as playing games, multi-user activities, etc., a user needs to keep the fingers on the front-side touch screen. Such postures of keeping fingers on the front side of the touch screen may cause inconvenience to the user. Further, such postures of keeping one or more fingers on the front touch interface may cause an uncomfortable feeling to the user. Further, keeping one or more fingers on the front side of the touch screen may cause finger fatigue.

Therefore, there is a need for a solution that can overcome the limitations, disadvantages, and the problems discussed above.

SUMMARY

Provided are a device with multiple touch interfaces and a method thereof.

Additional aspects will be set forth in part in the description which follows and, in part, will be apparent from the description, or may be learned by practice of the presented embodiments.

According to embodiments of the disclosure, a method includes: detecting a first finger touch on a primary touch interface of a user device; detecting a second finger touch on a secondary touch interface of the user device; identifying a first displacement of the first finger touch and a second displacement of the second finger touch within a timeframe window; and recognizing a multi-interface gesture based on the first displacement and the second displacement.

The recognizing the multi-interface gesture may include: identifying whether the first displacement and the second displacement correspond to opposite directions; and recognizing a virtual gear gesture based on identifying the first displacement and the second displacement correspond to opposite directions.

The method may further include controlling, based on the multi-interface gesture, at least one of a vibration of the user device, a rotation of a displayed object, a speed of the displayed object, display of an icon, and control of a corresponding Internet of Things (IoT) device.

The primary touch interface and the secondary touch interface may be on opposite sides of the user device.

The first displacement may correspond to a change of location of the first finger touch from an initial position to a subsequent position on the primary touch interface within the timeframe window, and the second displacement may correspond to a change of location of the second finger touch from an initial position to a subsequent position on the secondary touch interface within the timeframe window.

The method may further include: calculating a first coordinate on the primary touch interface corresponding to the initial position of the first finger touch and a second coordinate on the secondary touch interface corresponding to the initial position of the second finger touch. The method may also include determining whether the first coordinate is colinear with the second coordinate. The method may further include, based on determining that the first coordinate is colinear with the second coordinate, calculating a first distance from the initial position of the first finger touch to the subsequent position of the first finger touch within the timeframe window and a second distance from the initial position of the second finger touch to the subsequent position of the second finger touch within the timeframe window. The method may further include calculating a displacement velocity for each of the first finger touch and the second finger touch based on the first distance, the second distance and the timeframe window; and calculating an angular rotation for each of the first finger touch and the second finger touch based on the first distance, the second distance and a third distance between the primary touch interface and the secondary touch interface. The method may also include moving an object displayed by the user device based on the displacement velocity and the angular rotation.

The method may further include: measuring a finger pressure on the primary touch interface by the first finger touch and a finger pressure on the secondary touch interface by the second finger touch; and identifying whether each of the finger pressure on the primary touch interface and the finger pressure on the secondary touch interface is greater than a threshold pressure value. The calculating the displacement velocity may be performed based on the finger pressure on the primary touch interface and the finger pressure on the secondary touch interface both being greater than the threshold pressure value.

The method may further include: comparing the angular rotation with a threshold rotation. The method may also include calculating, based on the angular rotation being greater than the threshold rotation, a rotation and a time of motion based on a comparison between the angular rotation and the threshold rotation. The method may further include recognizing an inertial gear gesture based on the rotation and the time of motion. The inertial gear gesture may correspond to a motion due to an inertia of a virtual gear gesture.

The method may further include: recognizing a pair of simultaneous displacements based on a pair of first finger touches on the primary touch interface and a pair of second finger touches on the secondary touch interface; and determining a pair of virtual gear gestures based on the pair of simultaneous displacements. The method may also include calculating a plurality of parameters corresponding to the pair of virtual gear gestures; and comparing the plurality of parameters corresponding to the pair of virtual gear gestures. The method may further include determining a differential motion between the pair of virtual gear gestures based on a result of the comparing the plurality of parameters; and controlling a motion of an object displayed by the user device based on the differential motion.

The plurality of parameters may include a linear velocity, an angular momentum, an angular velocity, a rotation arc length, and an angular acceleration.

Each virtual gear gesture among the pair of virtual gear gestures may be determined based on a corresponding first displacement among the pair of first finger touches in an opposite direction to a corresponding second displacement among the pair of second finger touches.

The calculating the plurality of parameters may further include: calculating a third distance between the pair of first finger touches; and determining the differential motion between the pair of virtual gear gestures based on the third distance and the result of the comparing the plurality of parameters.

According to embodiments of the disclosure, a user device for recognizing a plurality of gestures, includes: a primary touch interface; a secondary touch interface; a memory; at least one processor communicatively coupled with the memory, the primary touch interface, and the secondary touch interface, wherein the at least one processor is configured to: detect a first finger touch on the primary touch interface; detect a second finger touch on the secondary touch interface; identify a first displacement of the first finger touch and a second displacement of the second finger touch within a timeframe window; and recognize a multi-interface gesture based on the first displacement and the second displacement.

To recognize the multi-interface gesture, the at least one processor may be configured to: identify whether a direction of the first displacement opposes a direction of the second displacement; and recognize a virtual gear gesture based on the direction of the first displacement opposing the direction of the second displacement, wherein the virtual gear gesture corresponds to a motion of an object in at least one of an X-axis, a Y-axis, a Z-axis, and a center axis of the object.

According to embodiments of the disclosure, a non-transitory computer readable recording medium includes a program configured to control a user device to perform a method, the method includes: detecting a first finger touch on a primary touch interface of the user device; detecting a second finger touch on a secondary touch interface of the user device; identifying a first displacement of the first finger touch and a second displacement of the second finger touch within a timeframe window; and recognizing a multi-interface gesture based on the first displacement and the second displacement.

According to embodiments of the disclosure, a device includes: a primary touch interface; a secondary touch interface; a memory; at least one processor communicatively coupled with the memory, the primary touch interface, and the secondary touch interface, wherein the at least one processor is configured to: identify a first finger touch on the primary touch interface and a second finger touch on the secondary touch interface; and identify a multi-interface gesture based on the first finger touch and the second finger touch.

The at least one processor may be further configured to: identify a first area corresponding to the first finger touch and a second area corresponding to the second finger touch; and identify the multi-interface gesture based on the first area and the second area both exceeding an area threshold.

The at least one processor may be further configured to identify a single touch gesture based on the first area exceeding the area threshold and the second area not exceeding the area threshold.

The at least one processor may be further configured to: identify a first pressure corresponding to the first finger touch and a second pressure corresponding to the second finger touch; and identify the multi-interface gesture based on the first pressure and the second pressure both exceeding a pressure threshold.

The at least one processor may be further configured to identify a single touch gesture based on the first area exceeding the area threshold and the first pressure exceeding the pressure threshold, and one of the second area not exceeding the area threshold or the second pressure not exceeding the pressure threshold.

The at least one processor may be further configured to identify the multi-interface gesture based on a first displacement of the first finger touch and a second displacement of the second finger touch corresponding to different directions.

The device may further include a display, and the at least one processor may be further configured to control rotation of an object displayed on the display according to the multi-interface gesture.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 illustrates a schematic block diagram of a user device, in accordance with an embodiment;

FIGS. 3B and 3C illustrates examples of data provided by touch electrodes configured in an array, in accordance with an embodiment;

DETAILED DESCRIPTION

Figure 2:
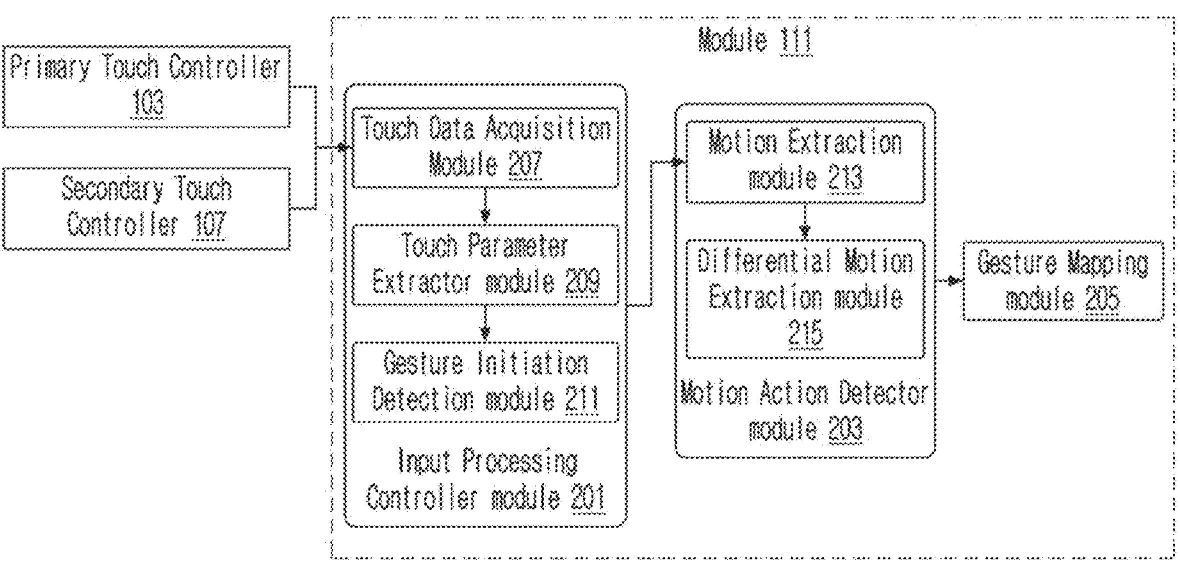
FIG. 2 illustrates a block diagram of a module in connection with a primary touch controller and a secondary touch controller, in accordance with an embodiment.

Embodiments are described below with reference to the drawings. Embodiments described herein are examples, and thus, the present disclosure is not limited thereto, and may be realized in various other forms. Each embodiment provided in the following description is not excluded from being associated with one or more features of another example or another embodiment also provided herein or not provided herein but consistent with the present disclosure.

The term "some" or "one or more" as used herein is defined as "one", "more than one", or "all." Accordingly, the terms "more than one," "one or more" or "all" would all fall under the definition of "some" or "one or more". The term "an embodiment", "another embodiment", "some embodiments", or "in one or more embodiments" may refer to one embodiment or several embodiments, or all embodiments. Accordingly, the term "some embodiments" is defined as meaning "one embodiment, or more than one embodiment, or all embodiments."

The terminology and structure employed herein are for describing, teaching, and illuminating some embodiments and their specific features and elements and do not limit, restrict, or reduce the spirit and scope of the claims or their equivalents. The phrase "exemplary" may refer to an example.

More specifically, any terms used herein such as but not limited to "includes," "comprises," "has," "consists," "have" and grammatical variants thereof do not specify an exact limitation or restriction and certainly do not exclude the possible addition of one or more features or elements, unless otherwise stated, and must not be taken to exclude the possible removal of one or more of the listed features and elements, unless otherwise stated with the limiting language "mush comprise" or "needs to include".

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined, all terms, and especially any technical and/or scientific terms, used herein may be taken to have the same meaning as commonly understood by one having ordinary skill in the art.

Embodiments will be described below in detail with reference to the accompanying drawings.

FIG. 1 illustrates a schematic block diagram of a user device 100, in accordance with an embodiment. The user device 100 includes a primary touch interface 101, a secondary touch interface 105, at least one processor 109 (hereinafter referred to as "processor"), a memory 113, and an input/output (I/O) interface 119. The primary touch interface 101 includes a primary touch controller 103 and the secondary touch interface 105 includes a secondary touch controller 107. The processor 109 includes one or more modules 111 (hereinafter referred to as "module"). The memory 113 includes a database 115 and an operating system (OS) 117. The processor 109, the primary touch interface 101, the secondary touch interface 105, the memory 113, and the I/O interface 119 are communicatively coupled with each other. In a non-limiting example, the user device 100 may correspond to a smartphone, a mobile, a tablet, a computer, a laptop, and all electronic devices having multiple touch interfaces.

According to an embodiment, the primary touch interface 101 refers to a user interface that relies primarily on touch input for interaction. The primary touch interface 101 allows for intuitive and direct interaction with the user device 100 directly, eliminating (or minimizing) the need for physical buttons or a mouse to interact with the user device 100. The primary touch interface 101 refers to a primary touch-sensitive interface on the user device 100. The primary touch interface 101 may receive input from a user for navigating through applications (i.e., apps), menus, and content on the user device 100. The primary touch interface 101 may register touch gestures, such as taps, swipes, and pinches, and the touch gesture may be translated into actions or commands that the processor 109 can understand and respond to. In a non-limiting example, in a dual-screen user device, the primary touch interface 101 may refer to a front side touch interface. The front side touch interface may be the main user interface through which the user predominantly interacts with the user device 100. Further, the primary touch interface 101 may also include a display. Alternatively, the primary touch interface 101 may also receive touch input only without having the display.

According to an embodiment, the secondary touch interface 105 refers to an additional touch-based input interface that complements the primary touch interface 101, and may be found on the user device 100 having multiple touch interfaces.

According to an embodiment, the secondary touch interface 105 may be smaller in size and provide users with quick access to certain features or functions without having to navigate through the primary touch interface 101. In a non-limiting example, the secondary touch interface 105 can be used for notifications, quick settings, music playback controls, or even as a virtual keyboard. The secondary touch interface 105 may be used to enhance the user experience by providing convenient and efficient access to commonly used functions on the user device 100. In a non-limiting example, in a dual-screen mobile device, the secondary touch interface 105 may refer to a back side touch interface. Further, the secondary touch interface 105 may also include the display. Alternatively, the secondary touch interface 105 may also receive touch input only without having the display. According to an embodiment, the primary touch interface 101 is on an opposite side of the secondary touch interface 105.

According to an embodiment, the primary touch controller 103 is a circuit or a device or a system that is responsible for translating a physical touch input on the primary touch interface 101 into a digital signal that can be understood by the OS 117 of the user device 100. The primary touch controller 103 determines a precise location and type of the physical touch input, and thereby converts the physical touch input into corresponding digital commands. The primary touch controller 103 may utilize a combination of sensors and algorithms to accurately detect and interpret touch gestures.

According to an embodiment, the secondary touch controller 107 is the circuit or the device or system that is responsible for the secondary touch interface 105. Further, the secondary touch controller 107 is configured to perform similar functions as the primary touch controller 103. Therefore, for the sake of brevity and to increase the succinctness of the specification, the working principality of the secondary touch controller 107 is not repeated.

According to an embodiment, the processor 109 may be operatively coupled to the module 111 for processing, executing, or performing a set of operations. In an embodiment, the processor 109 may include at least one data processor for executing processes in Virtual Storage Area Network. The processor 109 may include specialized processing components, such as integrated system (bus) controllers, memory management controllers, floating point controllers, graphics processing units (i.e., graphics processors), digital signal processing units (i.e., digital signal processors), etc. In some embodiments, the processor 109 may include a central processing unit (CPU), a graphics processing unit (GPU), or both. The processor 109 may be one or more general processors, digital signal processors, application-specific integrated circuits, field-programmable gate arrays, servers, networks, digital circuits, analog circuits, combinations thereof, or other now-known or later developed devices for analyzing and processing data. The processor 109 may execute one or more instructions, such as code generated manually (i.e., programmed) to perform one or more operations disclosed herein throughout the disclosure.

According to an embodiment, the processor 109 includes the module 111 for performing specific operations. The term "module" or "modules" used herein may imply a unit including, for example, one of hardware, and firmware or a combination thereof. The "module" may be interchangeably used with a term such as logic, a logical block, a component, and the like. The "module" may be a minimum device component for performing one or more functions or may be a part thereof. The processor 109 may control the module 111 to execute a specific set of operations described in the disclosure.

According to an embodiment, the memory 113 may include any non-transitory computer-readable medium including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The memory 113 is communicatively coupled with the processor 109 and may store bitstreams or processing instructions for completing the processes. Further, the memory 113 may include the OS 117 for performing one or more tasks of the user device 100. In an embodiment, the database 115 may be configured to store the information as required by the module 111 and the processor 109 to perform one or more functions for recognizing a plurality of gestures in the user device 100, as discussed throughout the disclosure. Further, one or more threshold values and other values are pre-stored in memory 109. Furthermore, one or more parameters value calculated by corresponding module are stored in the memory 109.

According to an embodiment, the I/O interface 119 includes hardware components that enable data communication between the user device 100 and any other devices or systems. The I/O interface 119 serves as a communication medium for exchanging information, commands, or data with the other devices or systems. The I/O interface 119 may be a part of the processor 109 or may be a separate component. The I/O interface 119 may include a physical connection implemented using hardware. The I/O interface 119 may be configured to connect with an external network, external media, the display, or any other components, or combinations thereof. The external network may be a physical connection, such as a wired Ethernet connection, or may be established wirelessly. In a non-limiting example, the user device 100 may be configured to communicate with one or more Internet of Things (IoT) devices via the I/O interface 119 for control operations of the IoT devices. In another non-limiting example, the user device 100 may be configured to communicate with one or more external devices outside home networks via the I/O interface 119 to control operations of the one or more external devices.

According to an embodiment, the processor 109 is configured to detect a first finger touch on the primary touch interface 101 of the user device 100. The processor 109 is further configured to detect a second finger touch on the secondary touch interface 105 of the user device 100. Upon detecting the first finger touch and the second finger touch, the processor 109 is configured to identify a first displacement of the first finger touch (i.e., due to motion of the first finger touch) and a second displacement of the second finger touch (i.e., due to motion of the second finger touch) within a timeframe window. Subsequently, the processor 109 is configured to recognize the plurality of gestures based on the identified first displacement and the second displacement.

FIG. 2 illustrates a block diagram of the module 111 as illustrated in FIG. 1 in connection with the primary touch controller 103 and the secondary touch controller 107, in accordance with an embodiment. The module 111 may utilize data stored in the database 115 of the memory 113 for performing corresponding operations. The database 115 may store executable instructions and/or data generated when the module 111 executes one or more operations. Also, the one or more operations are performed in conjunction with the processor 109. Further, the database 115 may store predefined threshold values and variable values which may be required for execution of the module 111.

According to an embodiment, the module 111 includes an input processing controller module 201, a motion action detector module 203, and a gesture mapping module 205. The module 111 is communicatively coupled with the primary touch controller 103 and the secondary touch controller 107. The module 111 receives input from the primary touch controller 103 and the secondary touch controller 107 at the time of detecting finger touches on the primary touch interface 101 and the secondary touch interface 105, respectively.

The input processing controller module 201 includes a touch data acquisition module 207, a touch parameter extraction module 209, and a gesture initiation detection module 211. The motion action detector module 203 includes a motion extraction module 213, and a differential motion extraction module 215.

Figure 3A:
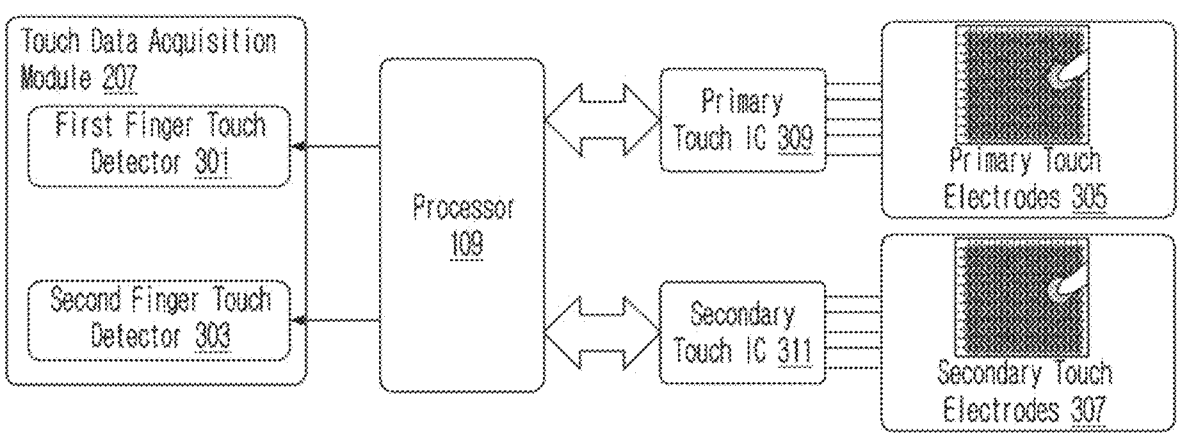
FIG. 3A illustrates a touch data acquisition module, in accordance with an embodiment.

FIG. 3A illustrates the touch data acquisition module 207 as shown in FIG. 2, in accordance with an embodiment.

As shown in FIG. 3A, the touch data acquisition module 207 includes a first finger touch detector 301 for detecting the first finger touch on primary touch electrodes 305. The primary touch electrodes 305 may be arranged in a grid pattern to cover the primary touch interface 101. The primary touch electrodes 305 enable touch functionality on the user device 100. The primary touch electrodes 305 work in conjunction with touch sensors to detect the first finger touch on the primary touch interface 101. When the user touches the primary touch interface 101, the primary touch electrodes 305 conduct electrical signals indicating touch inputs, such as the first finger touch, that are provided to the processor 109 via a primary touch integrated circuit (IC) 309. Thereafter, the processor 109 is configured to process the signals utilizing the first finger touch detector 301. The primary touch IC 309 is a component used in touch-sensitive devices that enables accurate and responsive touch input. The primary touch IC 309 acts as the interface between the primary touch electrodes 305 and the processor 109. Thus, the first finger touch detector 301 detects the first finger touch on the primary touch interface 101 of the user device 100.

Similarly, a second finger touch detector 303 detects the second finger touch on secondary touch electrodes 307. The secondary touch electrodes 307 conduct electrical signals indicating inputs, such as the second finger touch, that are provided to the processor 109 via a secondary touch integrated circuit (IC) 311. Therefore, the first finger touch detector 301 and the second finger touch detector 303 detect the first finger touch and the second finger touch, respectively, when there is any touch on respective touch interfaces. Thus, the second finger touch detector 303 detects the second finger touch on the secondary touch interface 105 of the user device 100.

FIGS. 3B and 3C illustrates an example of touch electrodes data in which the touch electrodes are configured in an array. FIG. 3B depicts an untouched condition and FIG. 3C depicts a touched condition, in accordance with an embodiment.

As shown in FIG. 3B, a frame of no-finger touch 321 includes capacitance values on the touch electrodes when no finger is touched. The capacitance values are almost similar when there is no touch or untouched condition. However, a frame of finger touched 323 includes a "portion A," shown in FIG. 3C, which includes values that are different than those outside of "portion A" when the user touches the portion of the touch electrodes. The electrical signals relating to the changed capacitance values are transferred from the touch electrodes to the processor 109 for detecting the touch interface.

Upon detecting the touch senses through the touch data acquisition module 207, the touch parameter extraction module 209 extracts one or more parameters based on a type of touch made by the user. The touch parameter extraction module 209 calculates one or more coordinates for each of the first finger touch on the primary touch interface 101 and the second finger touch on the secondary touch interface 105. The one or more coordinates may correspond to an X-axis coordinate and a Y-axis coordinate. Upon determining the coordinates, the touch parameter extraction module 209 measures an area of the first finger touching the primary touch interface 101 and an area of the second finger touching the secondary touch interface 105. Further, the touch parameter extraction module 209 extracts a major axis length in between extreme points of the area of the first finger touching the primary touch interface 101 in the Y-axis coordinate and a major axis length in between extreme points of the area of the second finger touching the secondary touch interface 105 in the Y-axis coordinate. Similarly, the touch parameter extraction module 209 extracts a minor axis length in between extreme points of the area of the first finger touching the primary touch interface 101 in the X-axis coordinate and a minor axis length in between extreme points of the area of the second finger touching the secondary touch interface 105 in the X-axis coordinate. The touch parameter extraction module 209 also extracts a coordinate of a center of the areas. In addition, the touch parameter extraction module 209 may calculate finger pressure on the primary touch interface 101 and the secondary touch interface 105. The area on the primary touch interface 101 and the secondary touch interface 105 depends on the finger pressure provided on each of the touch interfaces. For example, if the user puts more finger pressure on the touch interface, the area of the finger touch is broader in comparison to an area with less finger pressure on the touch interface.

Figure 4A:
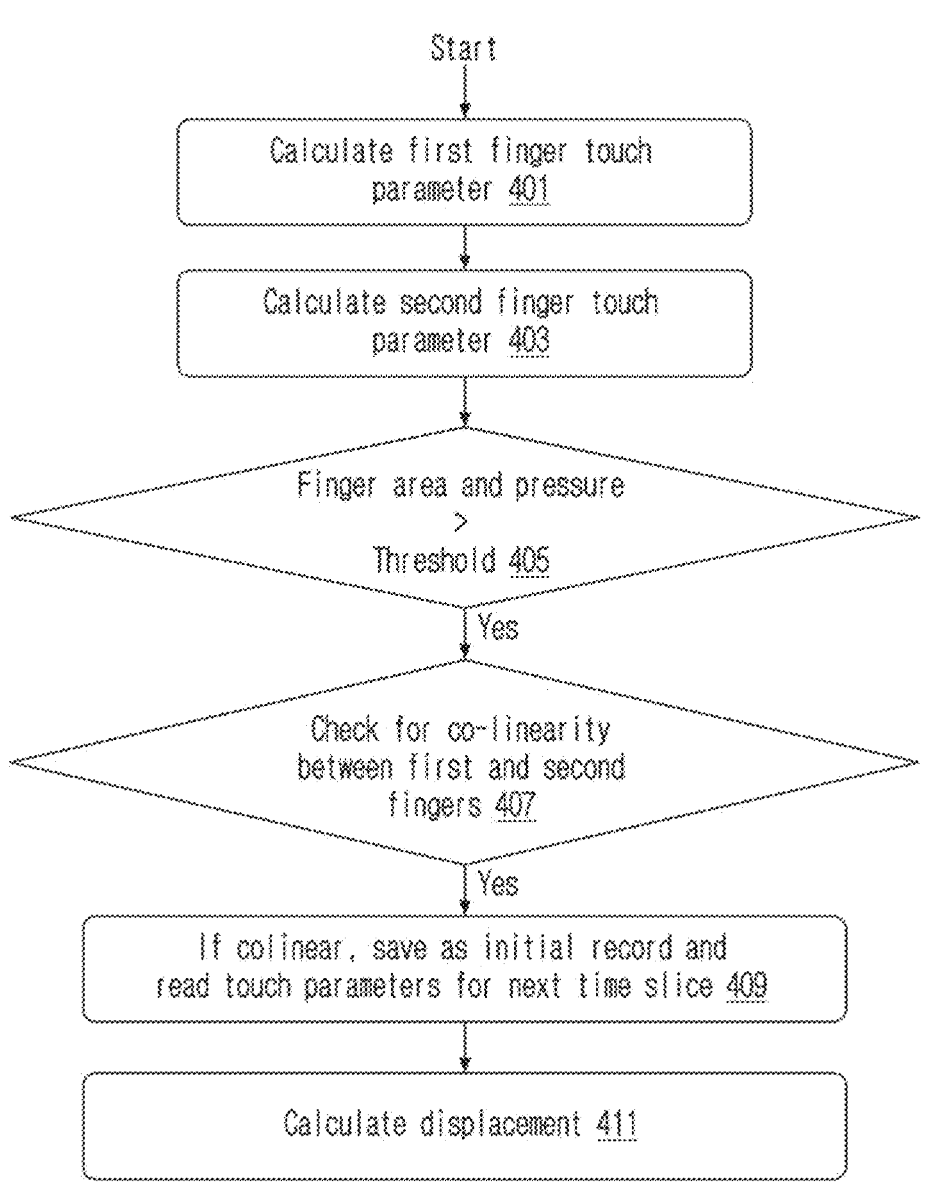
FIG. 4A illustrates a flow chart of a method performed by a gesture initiation detection module, in accordance with an embodiment.

FIG. 4A illustrates a flow chart of a method performed by the gesture initiation detection module 211 as illustrated in FIG. 2, in accordance with an embodiment.

According to an embodiment, the gesture initiation detection module 211 performs operations 401 to 411 to perform operations for detecting a gesture initiation. The gesture initiation detection module 211 initiates the operation from a start block of FIG. 4A and thereby proceeds to operation 401.

Figure 4B:
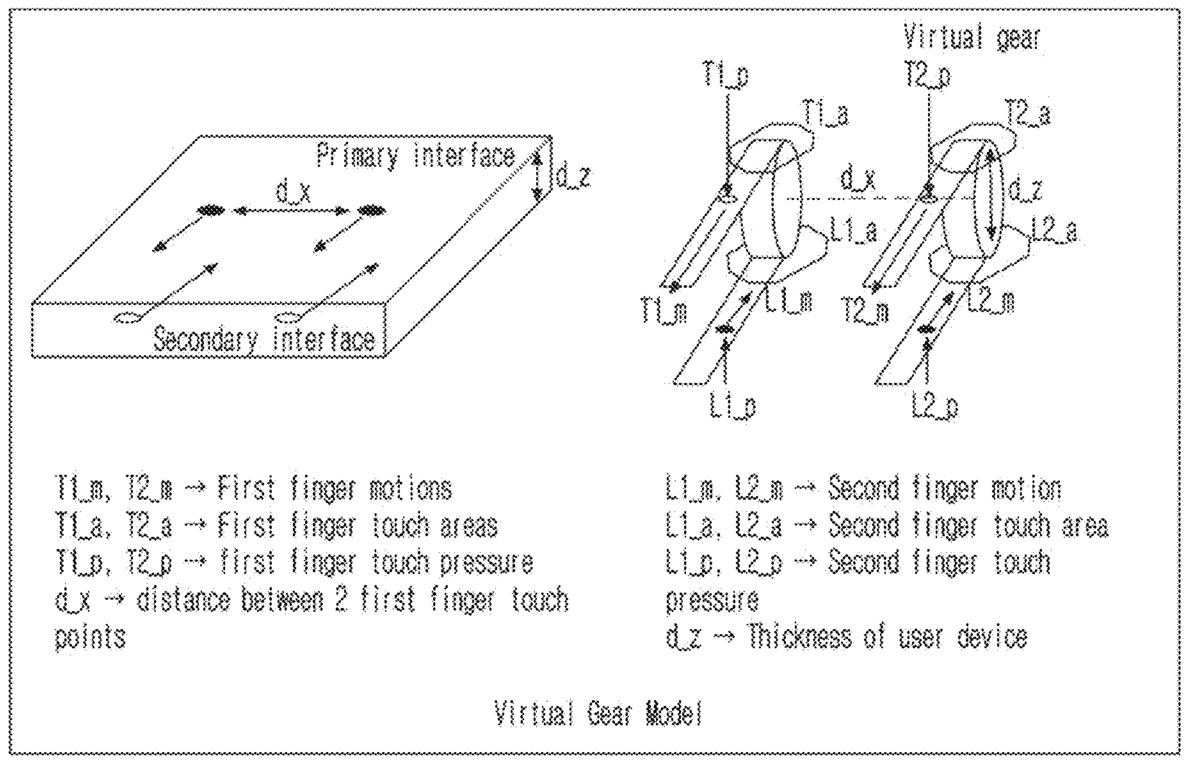
FIG. 4B illustrates a calculation of first finger touch parameters, in accordance with an embodiment.

In operation 401, the gesture initiation detection module 211 calculates first finger touch parameters based on one or more parameters extracted by the touch parameter extraction module 209 for the first finger touch on the primary touch interface 101. The calculation of first finger touch parameters is shown in FIG. 4B, in accordance with an embodiment. As shown in FIG. 4B, the calculation of the first finger touch is disclosed for a pair of finger touches, for example by a left hand finger and a right hand finger. T1_p relates to calculating a first coordinate and measuring the finger pressure on the primary touch interface 101. T1_p corresponds to an initial position of the first finger touch for the left hand finger. T2_p corresponds to the initial position of the first finger touch for the right hand finger. Further, T1_m relates to detecting a motion of the first finger touch on the primary touch interface 101 by the left hand finger. Similarly, T2_m relates to detecting a motion of the first finger touch on the primary touch interface 101 by the right hand finger. In addition, T1_a relates to calculating the areas for the first finger touch on the primary touch interface 101 by the left hand finger. T2_a relates to calculating the area of the first finger touch on the primary touch interface 101 by the right hand finger. Also, the gesture initiation detection module 211 determines a distance d_x between the pair of finger touches on the primary touch interface 101. In a non-limiting example, the first finger touch may correspond to the finger touch by a thumb finger of the user.

In operation 403, the gesture initiation detection module 211 calculates second finger touch parameters based on one or more parameters extracted by the touch parameter extraction module 209 for the second finger touch on the secondary touch interface 105. As shown in FIG. 4B, L1_p relates to calculating a second coordinate and measuring the finger pressure on the secondary touch interface 105 for a pair of finger touches, for example by a left hand finger and a right hand finger. L1_p corresponds to an initial position of the second finger touch for the left hand finger. L2_p relates to calculating a second coordinate and measuring the finger pressure on the secondary touch interface 105. L2_p corresponds to the initial position of the second finger touch for the right hand finger. Further, L1_m relates to detecting a motion of the second finger touch on the secondary touch interface 105 by the left hand finger. Similarly, L2_m relates to detecting a motion of the second finger touch on the secondary touch interface 105 by the right hand finger. In addition, L1_a relates to calculating the areas of the second finger touch on the secondary touch interface 105 by the left hand finger. L2_a relates to calculating the areas of the second finger touch on the secondary touch interface 105 by the right hand finger. Also, the gesture initiation detection module 211 determines a distance d_z between the first finger touch and the second finger touch. The distance d_z also alternatively represents a width/thickness of the user device 100. In addition, the distance d_z may also be referred to as a "second distance" throughout the description of the specification. In a non-limiting example, the second finger touch may correspond to the finger touch by a middle finger or an index finger.

In operation 405, the gesture initiation detection module 211 determines whether the areas calculated for each of the first finger touch and the second finger touch are greater than a threshold area. The comparison is performed to determine whether the finger touch is a valid multi-interface gesture or not. If the areas are less than the threshold area, then the finger touch may be an accidental touch and the finger touch may not correspond to initiating a valid multi-interface gesture among the plurality of gestures. Alternatively, if an area of a first finger touch on the primary touch interface 101 and an area of a second finger touch on the secondary touch interface 105 are both greater than the threshold area, then the finger touch may correspond to the valid multi-interface gesture. Thus, the gesture initiation detection module 211 compares the threshold area with T1_a, T2_a, L1_a, and L2_a to determine the valid multi-interface gesture.

Similarly, the gesture initiation detection module 211 determines whether the measured finger pressure for each of the first finger touch and the second finger touch is greater than a threshold pressure value. Each of the measured finger pressures is compared with the threshold pressure value to find out whether the gesture is a valid multi-interface gesture. If the measured finger pressure of the first finger touch on the primary touch interface 101 and the measured finger pressure of the second finger touch on the secondary touch interface 105 are both greater than the threshold pressure value, then the gesture is a valid multi-interface gesture. Alternatively, if one or more of the measured finger pressures is less than the threshold pressure value, then the gesture is not a valid multi-interface gesture. Thus, the gesture initiation detection module 211 compares the threshold pressure value with T1_p, T2_p, L1_p, and L2_p to determine the valid multi-interface gesture. If the areas are greater than the threshold area and the finger pressure is greater than the threshold pressure value, then gesture initiation detection module 211 moves to the next operation 407.

In operation 407, the gesture initiation detection module 211 determines whether the first coordinate with respect to the primary touch interface 101 is similarly positioned or colinear with the second coordinate with respect to the secondary touch interface 105. For example, positions on the primary touch interface 101 and the secondary touch interface 105 the gesture initiation detection module 211 may determine whether the first coordinate with respect to the primary touch interface 101 is within the second coordinate with respect to the secondary touch interface 105. If both the first coordinate and the second coordinate are similarly positioned or colinear, then the gesture is considered to be an initiation of the valid multi-interface gesture. In case of the initiation of the valid multi-interface gesture, the gesture initiation detection module 211 proceeds to operation 409.

In operation 409, if the first coordinate and the second coordinate are similarly positioned, then the gesture initiation detection module 211 stores the first coordinate and the second coordinate in the memory 109 for determining subsequent positions in a next timeframe window.

In operation 411, the gesture initiation detection module 211 calculates a first distance from the initial position to the subsequent position within the timeframe window for each of the first finger touch and the second finger touch. The "first distance" may correspond to d_y throughout the description. As shown in FIG. 6A, the displacement corresponds to starting from each of L1_p, L2_p, T1_p, and T2_p to the subsequent positions with the timeframe window. The gesture initiation detection module 211 also identifies a first displacement of the first finger touch and a second displacement of the second finger touch within the timeframe window. The first displacement corresponds to a change of location of the first finger touch from the initial position to the subsequent position on the primary touch interface 101 within the timeframe window. Similarly, the second displacement corresponds to a change of location of the second finger touch from the initial position to the subsequent position on the secondary touch interface 105 within the timeframe window. The first displacement and the second displacement is shown in Table 1 below:

TABLE 1

| time (ms) | Vg1 Dt (in cm) | Vg2 Dt (in cm) |
|---|---|---|
| 0 | 1.41 | 1.36 |
| 49.58 | 44 | 3.04 |
| 57.89 | 37.1 | 7.06 |
| 66.27 | 50 | 11.5 |
| 74.44 | 61.5 | 19.4 |

Figure 4C:
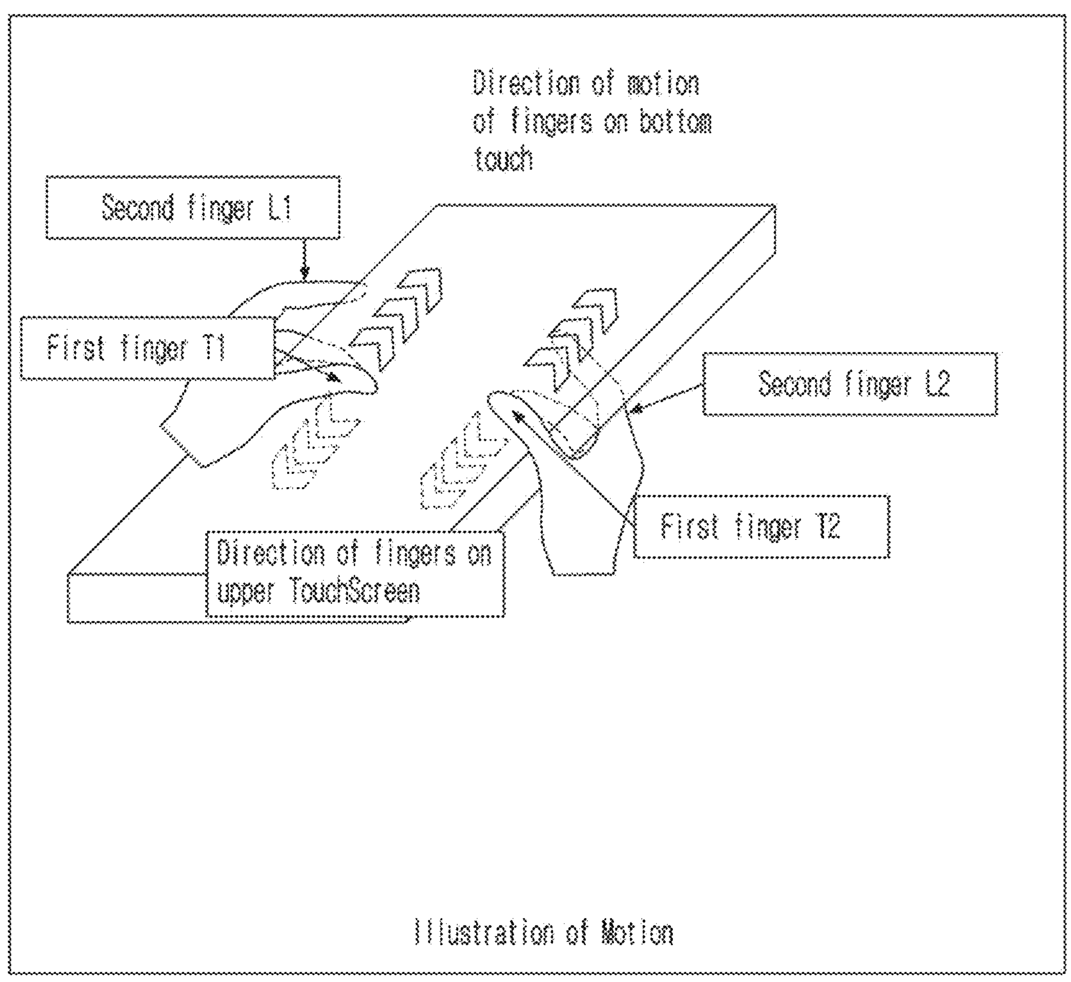
FIG. 4C illustrates an opposite-direction motion, in accordance with an embodiment.

Vg1 corresponds to the first displacement. Vg1 may be calculated based on change of location of the first finger touch from the initial position to the subsequent position, when the finger touch is off from the corresponding touch interface, within the timeframe window (time). Similarly, Vg2 is also calculated for the second displacement. In addition, the gesture initiation detection module 211 identifies a direction of the first displacement with respect to the second displacement. The gesture initiation detection module 211 identifies whether the direction of the first displacement corresponds to an opposite direction to a direction of the second displacement. If the direction of the first displacement is in the opposite direction of the direction of the second displacement, then the gesture is considered a valid multi-interface gesture. The illustration of the opposite direction is shown in FIG. 4C, in accordance with an embodiment. In a non-limiting example, as shown in FIG. 4C, the direction of the first displacement, i.e., a thumb finger is moving in an upward direction that is in the opposite direction of the second displacement, i.e., a middle finger is moving in a downward direction.

Alternatively, if the direction of the first displacement is in a similar direction to the direction of the second displacement, then the gesture is ignored.

The gesture initiation detection module 211 recognizes the plurality of gestures based on the identified first displacement and the second displacement. Further, if the gesture is considered a valid multi-interface gesture, then gesture initiation detection module 211 recognizes a virtual gear gesture among the plurality of gestures. The virtual gear gesture corresponds to a motion of an object in at least one of the X-axis, a Y-axis, a Z-axis, and a center axis of the object. Further, the plurality of gestures may correspond to at least one of a vibration of the user device, a rotation of the object, a speed of displacement of the object, an inclusion of an icon, and controlling a corresponding IoT device.

Figure 5:
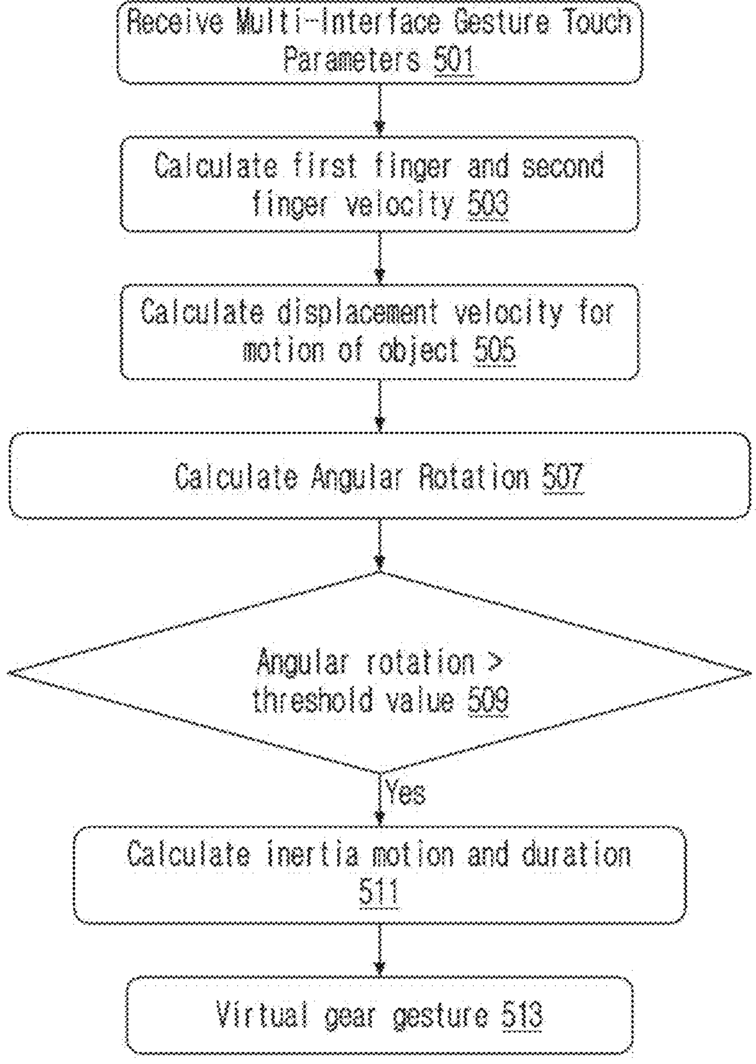
FIG. 5 illustrates a flow chart of a method performed by a motion extraction module, in accordance with an embodiment.

FIG. 5 illustrates a flow chart of a method performed by a motion extraction module, in accordance with an embodiment.

According to an embodiment, the motion extraction module 213 performs operations 501 to 513 to recognize a virtual gear gesture. The motion extraction module 213 initiates the operation from operation 501.

In operation 501, the motion extraction module 213 receives valid multi-interface gesture touch parameters from the gesture initiation detection module 211. The valid multi-interface gesture touch parameters include the first distance of each of the first finger touch and the second finger touch along with the timeframe window. In addition, the motion extraction module 213 receives the T1_m, T2_m, T1_a, T2_a, T1_p, T2_p, L1_m, L2_m, L1_a, L2_a, L1_p, L2_p, d_x, and d_y from the gesture initiation detection module 211 for valid multi-interface gestures. The motion extraction module 213 then proceeds to operation 503.

In operation 503, the motion extraction module 213 calculates a first finger velocity and a second finger velocity based on the corresponding calculated first distance and the timeframe window. The first finger velocity and the second finger velocity are linear velocities on a corresponding touch interface. The first finger velocity is determined based on the first distance covered by the first finger touch divided by the timeframe window. Similarly, the second finger velocity is determined based on the first distance covered by the second finger touch divided by the timeframe window. Thus, the first finger velocity and the second finger velocity for the pair of finger touches may be calculated using equations (1)-(4) mentioned below:

$$V\_T1\_first\_finger\_velocity = T1\_first\_distance/timeframe\_window \quad (1)$$

$$V\_L1\_first\_finger\_velocity = L1\_first\_distance/timeframe\_window \quad (2)$$

$$V\_T2\_first\_finger\_velocity = T2\_first\_distance/timeframe\_window \quad (3)$$

$$V\_L2\_first\_finger\_velocity = L2\_first\_distance/timeframe\_window \quad (4)$$

The motion extraction module 213 then proceeds to operation 505.

In operation 505, the motion extraction module 213 calculates a displacement velocity based on maximum velocity between the first finger velocity and the second finger velocity. The displacement velocity of each of the pair of finger touches may be calculated based on the maximum velocity between a corresponding first finger velocity and the second finger velocity. Thus, the displacement velocity may be calculated using equations (5) and (6) mentioned below:

$$Finger\_displacement\_velocity\_1 = maximum(V\_T1\_first\_finger\_velocity, V\_L1\_first\_finger\_velocity) \quad (5)$$

-continued $$Finger\_displacement\_velocity\_2 = maximum(V\_T2\_first\_finger\_velocity, V\_L2\_first\_finger\_velocity) \quad (6)$$

The motion extraction module 213 calculates the displacement velocity to recognize the motion of the object in the virtual gear gesture. According to another embodiment, the motion may correspond to linear motion. The motion extraction module 213 then proceeds to operation 507.

Figure 6:
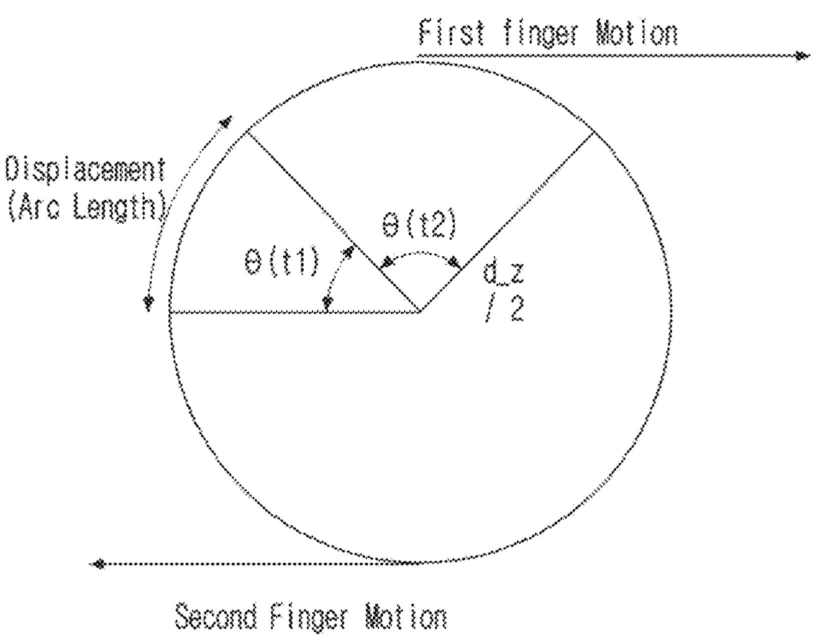
FIG. 6 illustrates an angular rotation by considering a circle formed based on a first finger touch and a second finger touch, in accordance with an embodiment.

In operation 507, the motion extraction module 213 calculates an angular rotation for each of the first finger touch and the second finger touch. The angular rotation is primarily calculated based on the first distance, the timeframe window, and the second distance (d_z). The angular rotation of the first finger touch and the second finger touch may be calculated based on angular displacement, angular velocity, and angular momentum. The angular rotation may be calculated by considering a circle formed based on the first finger touch and the second finger touch, such as the circle shown in FIG. 6. As shown in FIG. 6, the circle is formed by considering the first displacement and the second displacement. The first displacement and the second displacement may be considered as boundary points of the circle. Further, the radius of the circle may be calculated based on equation (7) as shown below:

$$\text{Radius of the circle} = d\_z/2 \quad (7)$$

Further, an arc length of the circle may be calculated based on the first distance. Based on the radius of the circle and the arc length, the angular displacement, the angular velocity, and the angular momentum may be calculated based on equations (8)-(10) as shown below:

$$\text{Angular displacement, } \theta = \text{Arc length/radius} \quad (8)$$

$$\text{Angular Velocity, } \omega = \text{Displacement velocity/radius} \quad (9)$$

$$\text{Angular Momentum, } L = I * \omega \quad (10)$$

Wherein, "I" is a moment of inertia of the gesture of mass M.

Mass M refers to a required mass of the virtual gear. Value of M determines how sensitivity of the virtual gear gesture. A lower value of M relates to initiating and ending the gesture in quick succession. While a higher value of M relates to initiating the gesture slowly but the gesture continues for a longer period of time even if the user is no longer touching the touch interface. This can be empirically determined based on the use case and the required level of feedback while performing the gesture.

Based on equations (8)-(10), and considering the second distance, d_z (thickness of the device) as, for example, 0.6 cm, experimental results are shown in Table 2. As shown in Table 2, Vg1 corresponds to the first finger touch, and Vg2 corresponds to the second finger touch.

TABLE 2

| Vg1_θ (rad) | Vg2_θ (rad) | Vg1_ω (rad/s) | Vg2_ω (rad/s) |
|---|---|---|---|
| 2.4 | 2.3 | 0.0001 | 1.603 |
| 73.4 | 5.1 | 0.0033 | 0.115 |
| 61.9 | 11.8 | 0.0028 | 0.317 |
| 83.4 | 19.1 | 0.0037 | 0.382 |
| 102.5 | 32.4 | 0.0046 | 0.527 |

The motion extraction module 213 then proceeds to operation 509.

In operation 509, the motion extraction module 213 compares the calculated angular rotation with a threshold rotation. The threshold rotation is associated with a minimum rotation for an effect on the motion of the virtual gear gesture. If the calculated angular rotation is greater than the threshold rotation, the motion extraction module 213 then proceeds to operation 511.

In operation 511, when the calculated angular rotation is greater than the threshold rotation, the motion extraction module 213 calculates a rotation and a time of motion based on a comparison between the calculated angular rotation and the threshold rotation. Subsequently, the motion extraction module 213 recognizes an inertial gear gesture among the plurality of gestures based on the calculated rotation and the time of motion. The inertial gear gesture corresponds to a motion due to an inertia of the virtual gear gesture. The rotation may be calculated based on an initial momentum, which is last calculated momentum at time t=n when the finger touch is released from the touch interface. A final momentum may be considered zero (0). In addition, as the finger touch is released and no more force is applied, then the inertial of the virtual gear gesture has to stop. The inertia of the virtual gear gesture may be calculated based on equation (11) as shown below:

$$\Delta\theta = \omega_{initial}^2 / 2\alpha \tag{11}$$

wherein α is a standard deceleration of the inertia of the virtual gear gesture. For example, the standard deceleration may be set as a default standard deceleration, and in some embodiments may be able to be modified through a user interface of the device.

In a non-limiting example, the inertial gear gesture may correspond to sliding a list of contacts even if the finger touch is released based on the inertia of the virtual gear gesture. The motion extraction module 213 then proceeds to operation 513.

In operation 513, the motion extraction module 213 recognizes the motion of the object associated with the virtual gear gesture based on the calculated displacement velocity and the calculated angular rotation. According to an embodiment, the motion may correspond to angular motion and the linear motion of the object in the virtual gear gesture.

Figure 7:
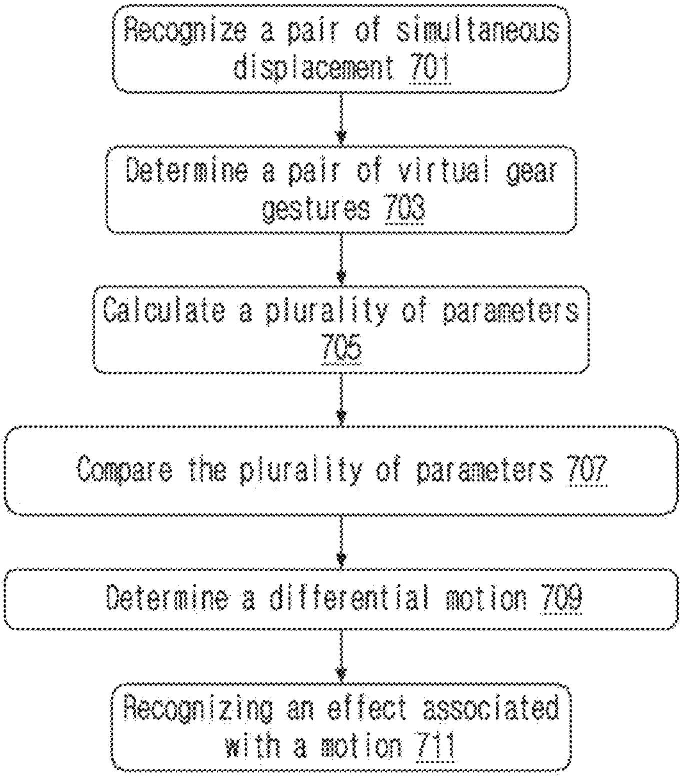
FIG. 7 illustrates a flow chart of a method performed by a differential motion extraction module, in accordance with an embodiment.

FIG. 7 illustrates a flow chart of a method performed by the differential motion extraction module 215 as illustrated in FIG. 2, in accordance with an embodiment.

In operation 701, the differential motion extraction module 215 recognizes a pair of simultaneous displacements of a pair of first finger touches and a pair of second finger touches based on a pair of first displacements on the primary touch interface 101 and a pair of second displacements on the secondary touch interface 105. As shown in FIG. 4C, if first finger T1, first finger T2, second finger L1, and second finger L2 move simultaneously, the differential motion extraction module 215 recognizes the pair of simultaneous displacements as, for example, a valid multi-interface gesture. The differential motion extraction module 215 then proceeds to operation 703.

In operation 703, the differential motion extraction module 215 determines a pair of virtual gear gestures based on the recognized pair of simultaneous displacements. Each virtual gear gesture among the pair of virtual gear gestures is determined based on a corresponding first displacement in an opposite direction to a corresponding second displacement. As shown in FIG. 4C, the displacement of the first finger T1 is opposite to the displacement of the second finger L1. Similarly, the displacement of the first finger T2 is opposite to the displacement of the second finger L2. The differential motion extraction module 215 then proceeds to operation 705.

In operation 705, the differential motion extraction module 215 calculates a plurality of parameters corresponding to each virtual gear gesture among the pair of virtual gear gestures. The plurality of parameters corresponds to a linear velocity (v), an angular momentum (L), an angular velocity (ω), a rotation arc length (θ), and an angular acceleration (α). The plurality of parameters may be calculated based on equations (1)-(11). In addition, differential motion extraction module 215 calculates a third distance between the pair of first finger touches. The third distance may be calculated between the center of each of the areas of the pair of finger touches. The "third distance" may correspond to d_x. The differential motion extraction module 215 then proceeds to operation 707.

In operation 707, the differential motion extraction module 215 compares the plurality of parameters between each of a corresponding virtual gear gesture among the pair of virtual gear gestures. The differential motion extraction module 215 then proceeds to operation 709.

In operation 709, the differential motion extraction module 215 determines a differential motion between the pair of virtual gear gestures based on a result of the comparison and on the calculated third distance. The differential motion is a result of the relative motion between two moving virtual gear gestures. The differential motion extraction module 215 then proceeds to operation 711.

Figure 8:
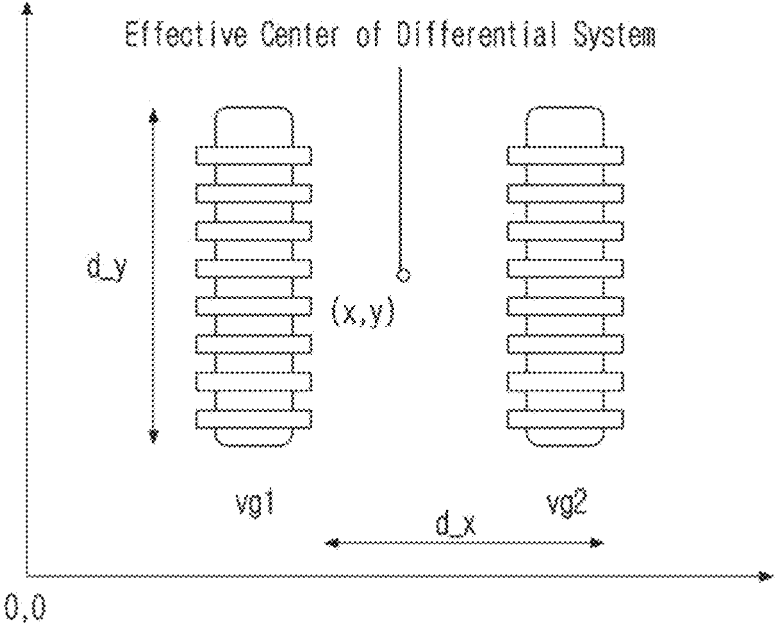
FIG. 8 illustrates recognition of a pair of virtual gear gestures, in accordance with an embodiment.

In operation 711, the differential motion extraction module 215 recognizes an effect associated with a motion of the object based on the determined differential motion. FIG. 8 illustrates an embodiment of recognition of the pair of virtual gear gestures, in accordance with an embodiment. The Vg1 may correspond to a first virtual gear gesture. Similarly, the Vg1 may correspond to a second virtual gear gesture.

According to an embodiment, the gesture mapping module 205 maps the differential motion into a corresponding motion. Initially, the gesture mapping module 205 determines if there is any content or object on the touch interface that can be transformed, e.g., scrolling content, movable content, three-dimensional (3D) models, etc. Alternatively, if there is no content or object available, the gesture mapping module 205 may control the functionality of one or more IoT devices or other devices. Based on the determination, the gesture mapping module 205 applies the differential motion to the coordinates of the content or object. Subsequently, the gesture mapping module 205 performs the motions of the object as per the user's gestures. In a non-limiting example, the motions of the object may correspond to a pitch rotation, a yaw rotation, a roll rotation, dual touch gestures, etc.

According to an embodiment, a translational matrix may be calculated based on the differential motion between the pair of virtual gear gestures. The translation matrix may be represented by a square matrix, and elements of the translational matrix determine the relationships between the variables of the pair of virtual gear gestures. The translational matrix may be calculated using equations (12)-(16).

An Instantaneous Center of Rotation (ICR), R, may be calculated based on equations (12) and (13):

$$\omega \cdot (R + b/2) = v_R \tag{12}$$

$$\omega \cdot (R - b/2) = v_L$$

$$\omega = (v_R - v_L)/b \tag{13}$$

$$R = b/2 \cdot (v_R + v_L)/(v_R - v_L)$$

Where $V_R$ relates to a speed of the second virtual gear gesture (i.e., right gear gesture), $V_L$ relates to the speed of the first virtual gear gesture (i.e., left gear gesture); and b corresponds to the minor axis length; ω is the angular velocity.

Based on equations (12) and (13), a rotational velocity, V, at point (X, Y) may be calculated by equations (14) and (15):

$$V = \omega \cdot R = \frac{v_R + v_L}{2} \tag{14}$$

$$\begin{bmatrix} \dot{x}_B \\ \dot{y}_B \\ \dot{\varphi} \end{bmatrix} = \begin{bmatrix} vx_B \\ vy_B \\ \omega \end{bmatrix} \overset{v=r\omega}{\cong} \begin{bmatrix} \frac{r}{2} & \frac{r}{2} \\ 0 & 0 \\ -\frac{r}{b} & \frac{r}{b} \end{bmatrix} \begin{bmatrix} \omega_L \\ \omega_R \end{bmatrix} \tag{15}$$

Finally, based on equations (12)-(15), the translation matrix at point (X, Y) may be calculated by equation (16):

$$\begin{bmatrix} \dot{x} \\ \dot{y} \\ \dot{\varphi} \end{bmatrix} = \begin{bmatrix} \cos\varphi & 0 \\ \sin\varphi & 0 \\ 0 & 1 \end{bmatrix} \begin{bmatrix} V \\ \omega \end{bmatrix} \tag{16}$$

Figure 9:
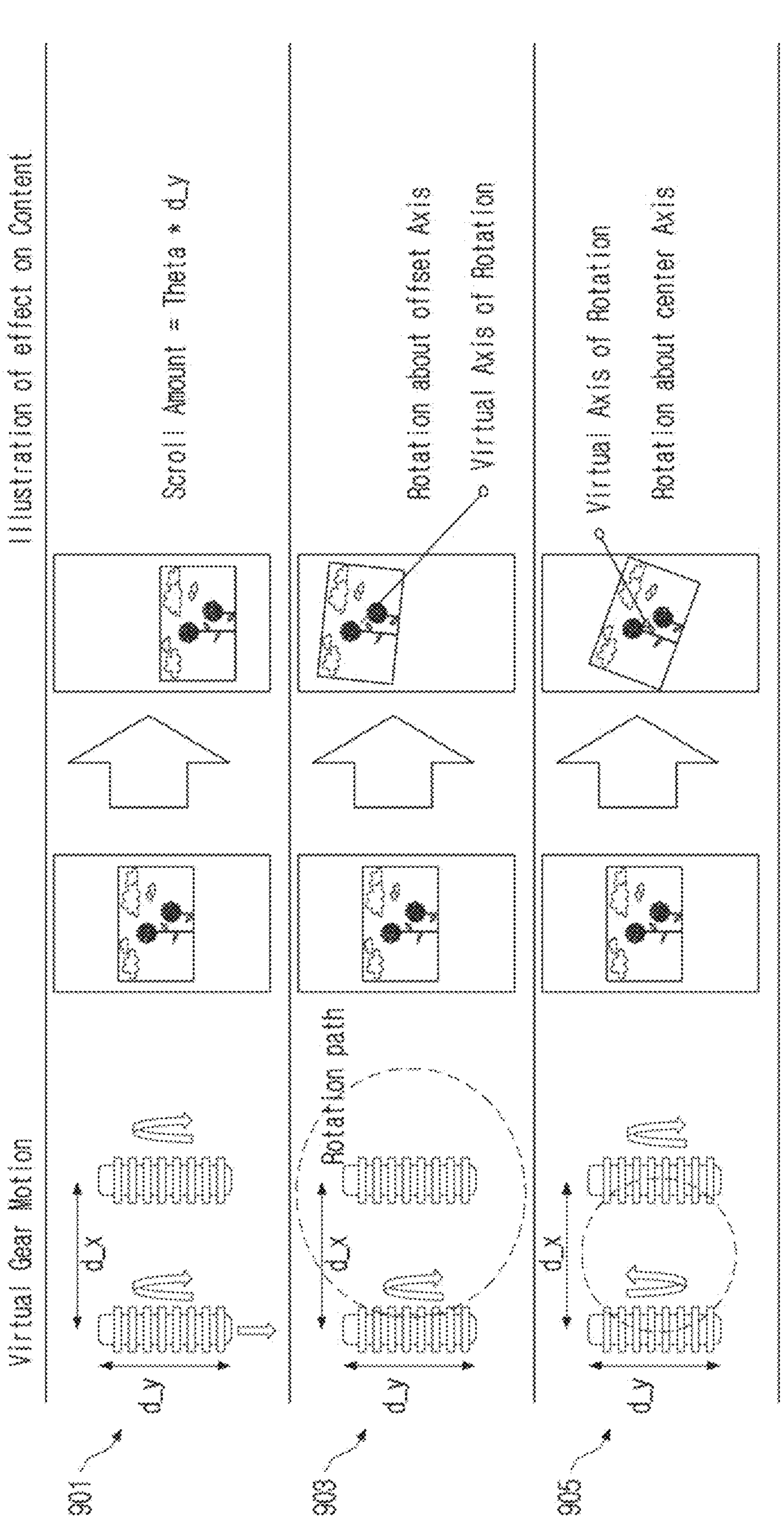
FIG. 9 illustrates a plurality of example scenarios associated with motion of an object based on determined differential motion, in accordance with an embodiment.

FIG. 9 illustrates a plurality of example scenarios associated with the motion of the object based on the determined differential motion, in accordance with an embodiment.

In scenario 901, both the virtual gear gestures are moving in the same direction, thus, the object may be scrolled. The same direction relates to the pair of first fingers moving in the same direction, i.e., either in an upward direction or in a downward direction. Similarly, the pair of second fingers are moving in the same direction, i.e., either in an upward direction or in a downward direction. However, the motion of the pair of first fingers is in the opposite direction to the pair of second fingers. In a non-limiting example, when the pair of virtual gear gestures are moving in the same direction, then the motion of the object may be considered as an additive motion.

In scenario 903, one of the pair of virtual gear gestures is in motion, whereas the other gear gesture is unavailable. For scenario 903, based on the detected virtual gear gestures, the object may rotate about an offset axis.

In scenario 905, the pair of virtual gear gestures are moving in the opposite direction, thus, the object may be rotated about a center axis. The opposite direction relates to the pair of first fingers moving in the opposite direction, i.e., if one first finger among the pair of first fingers is moving in the upward direction, then the other first finger is moving in the downward direction. In a non-limiting example, when the pair of virtual gear gestures are moving in the opposite direction, then the motion of the object may be considered a negative motion.

Figure 10:
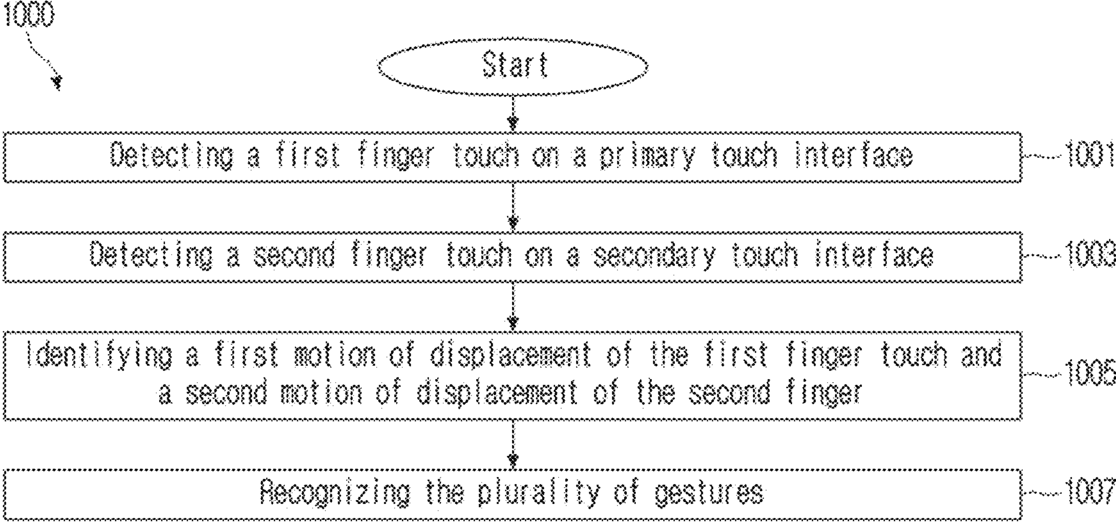
FIG. 10 illustrates a flow chart of a method for recognizing a plurality of gear gestures, in accordance with an embodiment.

FIG. 10 illustrates a flow chart of a method 1000 for recognizing the plurality of gear gestures in the user device 100, in accordance with an embodiment. The method initializes execution from the start block of FIG. 10.

In operation 1001, the method 1000 includes detecting the first finger touch on the primary touch interface 101 of the user device 100. The first finger touch detector 301 of the touch data acquisition module 207 detects the first finger touch on the primary touch interface 101. The flow of the method then proceeds to operation 1003.

In operation 1003, the method 1000 includes detecting the second finger touch on the secondary touch interface 105 of the user device. The second finger touch detector 303 of the touch data acquisition module 207 detects the second finger touch on the secondary touch interface 105. The flow of the method then proceeds to operation 1005.

In operation 1005, the method 1000 includes identifying the first displacement of the first finger touch and the second displacement of the second finger touch within the time-frame window. The gesture initiation detection module 211 identifies the first displacement and the second displacement. The flow of the method then proceeds to operation 1007.

In operation 1007, the method 1000 includes recognizing the plurality of gestures based on the identified first displacement and the second displacement. The gesture initiation detection module 211 recognizes the plurality of gestures based on the identified first displacement and the second displacement.

Figure 11:
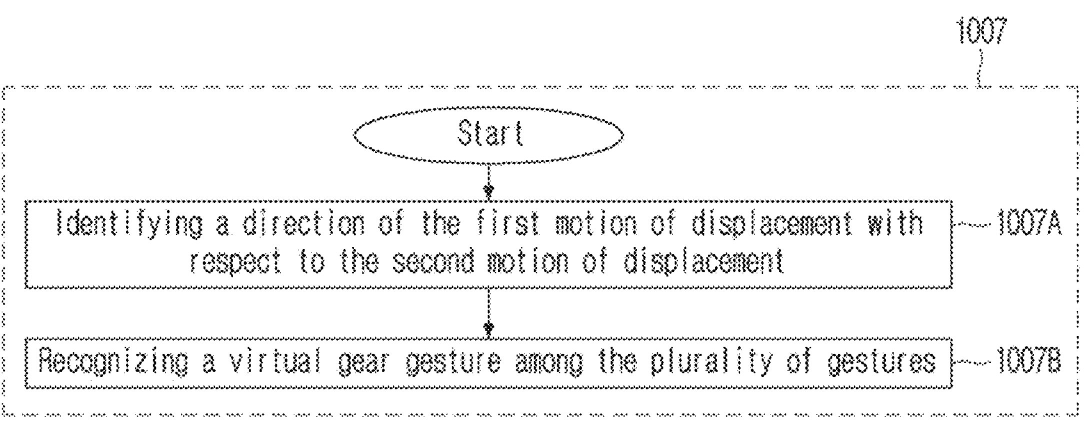
FIG. 11 illustrates a flow chart of operations of recognizing a plurality of gestures, in accordance with an embodiment.

FIG. 11 illustrates a flow chart of subsequent operations of recognizing the plurality of gestures as disclosed in operation 1007 of FIG. 10, in accordance with an embodiment. The method initializes execution from the start block of FIG. 11.

In operation 1007A, the method 1007 includes identifying the direction of the first displacement with respect to the second displacement. The direction of the first displacement corresponds to the opposite direction of the direction of the second displacement. Alternatively, if the direction of the first displacement corresponds to the similar direction to the direction of the second displacement, then the method 907 includes ignoring the motion. The flow of the method then proceeds to operation 1007B.

In operation 1007B, the method 1007 includes recognizing the virtual gear gesture among the plurality of gestures when the identified direction corresponds to the opposite direction. The virtual gear gesture corresponds to the motion of the object in at least one of the X-axis, the Y-axis, the Z-axis, and the center axis of the object.

While the operations discussed above with respect to FIG. 10 and FIG. 11 are shown and described in a particular sequence, the operations may occur in variations to the sequence in accordance with various embodiments. Further, a detailed description related to the various operations of FIG. 10 and FIG. 11 is already covered in the description related to FIGS. 1-7 and is omitted herein for the sake of brevity.

Figure 12A:
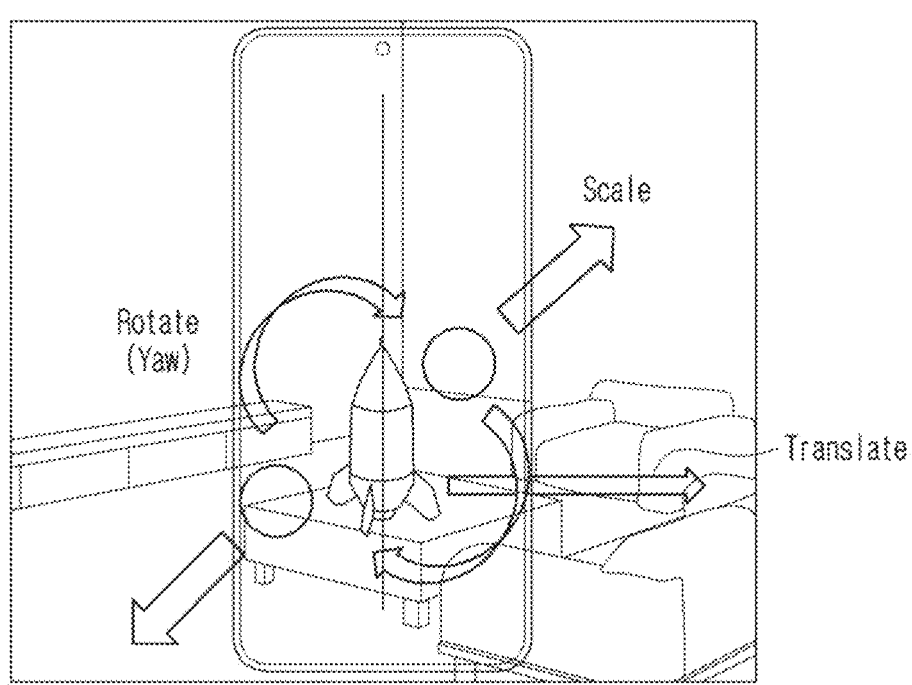
FIGS. 12A and 12B illustrate example use cases for implementation of the virtual gear gesture, in accordance with an embodiment.
Figure 12B:
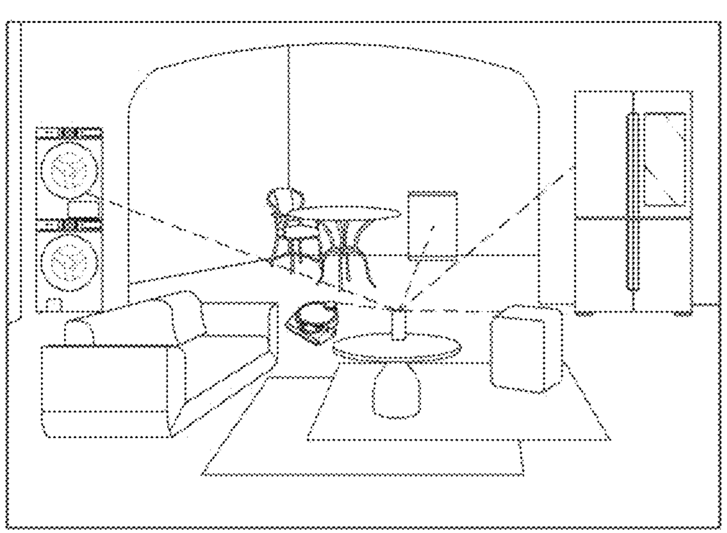
Figure 12B:
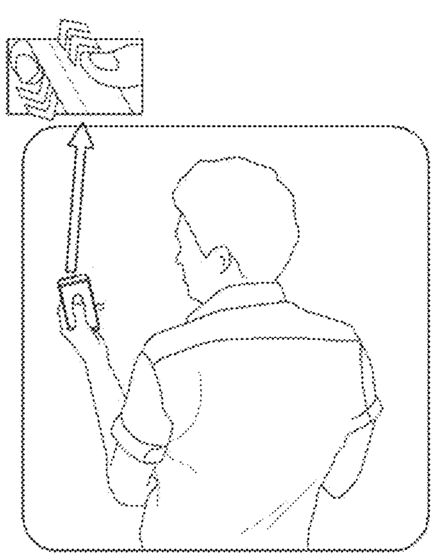

FIGS. 12A and 12B illustrate example use cases for implementation of the virtual gear gesture, in accordance with an embodiment.

As shown in FIG. 12A, while playing a game via any one of an Augmented Reality (AR), a Virtual Reality (VR), or a Mixed Reality (MR) environment, the user may simultaneously scale and rotate any object in more than four degrees of freedom (DOFs) (number of basic ways the 3D object can move through 3D space). For example, an object may be rotated in various directions, translated in various directions, and scaled.

As shown in FIG. 12B, the user may easily control the IoT devices with the help of virtual gear gesture instead of through a dedicated user interface for controlling the IoT devices.

One or more embodiments provide technical advantages of effectively recognizing the virtual gesture based on the first finger touch on the primary touch interface 101 and the second finger touch on the secondary touch interface 105. The user may easily place fingers on both sides of the dual-touch or the multi-touch interface device to control operations. The virtual gear gesture may be utilized during playing video games on the user device 100 which requires multiple controls based on the user's finger touches. In addition, the virtual gear gesture allows greater than 4 DOFs simultaneously to scale and rotate an AR object.

While aspects of embodiments have been particularly shown and described, it will be understood that various changes in form and details may be made therein without departing from the spirit and scope of the following claims.

What is claimed is:

1. A method comprising:

detecting a first finger touch on a primary touch interface of a user device;

detecting a second finger touch on a secondary touch interface of the user device;

identifying a first displacement of the first finger touch and a second displacement of the second finger touch within a timeframe window;

identifying an arc length based on the first displacement and the second displacement;

identifying an angular rotation based on the arc length and a radius of a circle formed by the first displacement and the second displacement, the radius being half of a distance between the primary touch interface and the secondary touch interface; and recognizing a multi-interface gesture based on the angular rotation.

2. The method as claimed in claim 1, wherein the recognizing the multi-interface gesture comprises:

identifying whether the first displacement and the second displacement correspond to opposite directions; and recognizing a virtual gear gesture based on identifying the first displacement and the second displacement correspond to opposite directions.

3. The method as claimed in claim 2, further comprising controlling, based on the multi-interface gesture, at least one of a vibration of the user device, a rotation of a displayed object, a speed of the displayed object, display of an icon, and control of a corresponding Internet of Things (IoT) device.

4. The method as claimed in claim 1, further comprising comparing the angular rotation with a threshold rotation, wherein the recognizing the multi-interface gesture is performed based on the angular rotation exceeding the threshold rotation.

5. The method as claimed in claim 1, wherein the first displacement corresponds to a change of location of the first finger touch from an initial position to a subsequent position on the primary touch interface within the timeframe window, and wherein the second displacement corresponds to a change of location of the second finger touch from an initial position to a subsequent position on the secondary touch interface within the timeframe window.

6. The method as claimed in claim 5, further comprising:

recognizing a pair of simultaneous displacements based on a pair of first finger touches on the primary touch interface and a pair of second finger touches on the secondary touch interface;

determining a pair of virtual gear gestures based on the pair of simultaneous displacements;

calculating a plurality of parameters corresponding to the pair of virtual gear gestures;

comparing the plurality of parameters corresponding to the pair of virtual gear gestures;

determining a differential motion between the pair of virtual gear gestures based on a result of the comparing the plurality of parameters; and controlling a motion of an object displayed by the user device based on the differential motion.

7. The method as claimed in claim 6, wherein the plurality of parameters comprises a linear velocity, an angular momentum, an angular velocity, the arc length, and an angular acceleration.

8. The method as claimed in claim 6, wherein each virtual gear gesture among the pair of virtual gear gestures is determined based on a corresponding first displacement among the pair of first finger touches in an opposite direction to a corresponding second displacement among the pair of second finger touches.

9. The method as claimed in claim 6, wherein the calculating the plurality of parameters further comprises:

calculating a third distance between the pair of first finger touches; and determining the differential motion between the pair of virtual gear gestures based on the calculated third distance and the result of the comparing the plurality of parameters.

10. A method comprising:

detecting a first finger touch on a primary touch interface of a user device;

detecting a second finger touch on a secondary touch interface of the user device;

identifying a first displacement of the first finger touch and a second displacement of the second finger touch within a timeframe window;

calculating an angular rotation based on the first displacement and the second displacement; and recognizing a multi-interface gesture based on the first displacement and the second displacement, wherein the first displacement corresponds to a change of location of the first finger touch from an initial position to a subsequent position on the primary touch interface within the timeframe window, wherein the second displacement corresponds to a change of location of the second finger touch from an initial position to a subsequent position on the secondary touch interface within the timeframe window, wherein the method comprises:

calculating a first coordinate on the primary touch interface corresponding to the initial position of the first finger touch and a second coordinate on the secondary touch interface corresponding to the initial position of the second finger touch;

determining whether the first coordinate is colinear with the second coordinate;

based on determining that the first coordinate is colinear with the second coordinate, calculating a first distance from the initial position of the first finger touch to the subsequent position of the first finger touch within the timeframe window and a second distance from the initial position of the second finger touch to the subsequent position of the second finger touch within the timeframe window;

calculating a displacement velocity for each of the first finger touch and the second finger touch based on the first distance, the second distance and the timeframe window; and moving an object displayed by the user device based on the displacement velocity and the angular rotation.

11. The method as claimed in claim 10, wherein the calculating the displacement velocity comprises:

measuring a finger pressure on the primary touch interface by the first finger touch and a finger pressure on the secondary touch interface by the second finger touch;

identifying whether each of the finger pressure on the primary touch interface and the finger pressure on the secondary touch interface is greater than a threshold pressure value; and calculating the displacement velocity based on the finger pressure on the primary touch interface and the finger pressure on the secondary touch interface both being greater than the threshold pressure value.

12. The method as claimed in claim 10, when the calculating the angular rotation further comprises:

comparing the angular rotation with a threshold rotation;

calculating, based on the angular rotation being greater than the threshold rotation, a rotation and a time of motion based on a comparison between the angular rotation and the threshold rotation; and recognizing an inertial gear gesture based on the rotation and the time of motion, wherein the inertial gear gesture corresponds to a motion due to an inertia of a virtual gear gesture.

13. A user device for recognizing a plurality of gestures, the user device comprising:

a primary touch interface;

a secondary touch interface;

a memory;

at least one processor communicatively coupled with the memory, the primary touch interface, and the secondary touch interface, wherein the at least one processor is configured to:

detect a first finger touch on the primary touch interface;

detect a second finger touch on the secondary touch interface;

identify a first displacement of the first finger touch and a second displacement of the second finger touch within a timeframe window;

identify an arc length based on the first displacement and the second displacement;

identify an angular rotation based on the arc length and a radius of a circle formed by the first displacement and the second displacement, the radius being half of a distance between the primary touch interface and the secondary touch interface; and recognize a multi-interface gesture based on the angular rotation.

14. The user device as claimed in claim 13, wherein to recognize the multi-interface gesture the at least one processor is further configured to:

identify whether a direction of the first displacement opposes a direction of the second displacement; and recognize a virtual gear gesture based on the direction of the first displacement opposing the direction of the second displacement, wherein the virtual gear gesture corresponds to a motion of an object in at least one of an X-axis, a Y-axis, a Z-axis, and a center axis of the object.

15. A device comprising:

a primary touch interface;

a secondary touch interface;

a memory;

at least one processor communicatively coupled with the memory, the primary touch interface, and the secondary touch interface, wherein the at least one processor is configured to:

identify a first finger touch on the primary touch interface and a second finger touch on the secondary touch interface;

identify an arc length based on the first finger touch and the second finger touch;

identify an angular rotation based on the arc length and a radius of a circle formed by the first finger touch and the second finger touch, the radius being half of a distance between the primary touch interface and the secondary touch interface; and identify a multi-interface gesture based on the angular rotation.

16. The device as claimed in claim 15, wherein the at least one processor is further configured to:

identify a first area corresponding to the first finger touch and a second area corresponding to the second finger touch; and identify the multi-interface gesture based on the first area and the second area both exceeding an area threshold.

17. The device as claimed in claim 16, wherein the at least one processor is further configured to identify a single touch gesture based on the first area exceeding the area threshold and the second area not exceeding the area threshold.

18. The device as claimed in claim 16, wherein the at least one processor is further configured to:

identify a first pressure corresponding to the first finger touch and a second pressure corresponding to the second finger touch; and identify the multi-interface gesture based on the first pressure and the second pressure both exceeding a pressure threshold.

19. The device as claimed in claim 18, wherein the at least one processor is further configured to identify a single touch gesture based on the first area exceeding the area threshold and the first pressure exceeding the pressure threshold, and one of the second area not exceeding the area threshold or the second pressure not exceeding the pressure threshold.

20. The device as claimed in claim 18, wherein the at least one processor is further configured to identify the angular rotation based on a first displacement of the first finger touch and a second displacement of the second finger touch corresponding to different directions.

* * * * *